(12) United States Patent
Kato

(10) Patent No.: US 12,151,495 B2
(45) Date of Patent: Nov. 26, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Minako Kato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/307,078

(22) Filed: Apr. 26, 2023

(65) Prior Publication Data
US 2023/0347674 A1 Nov. 2, 2023

(30) Foreign Application Priority Data
May 2, 2022 (JP) .................................. 2022-075989

(51) Int. Cl.
*B41M 3/06* (2006.01)
*H04N 1/028* (2006.01)
*H04N 1/60* (2006.01)

(52) U.S. Cl.
CPC ............ *B41M 3/06* (2013.01); *H04N 1/0282* (2013.01); *H04N 1/6016* (2013.01)

(58) Field of Classification Search
None
See application file for complete search history.

(56) References Cited

FOREIGN PATENT DOCUMENTS

| JP | 2007-121618 A | | 5/2007 | |
|----|---------------|---|--------|---|
| JP | 2017228883 A | * | 12/2017 | |
| JP | 2018067769 A | * | 4/2018 | |
| JP | 2018125790 A | * | 8/2018 | ............. G01N 21/64 |

OTHER PUBLICATIONS

English translation of JP-2017228883-A. (Year: 2017).*
English translation of JP-2018067769-A. (Year: 2018).*
English translation of JP-2018125790-A. (Year: 2018).*

* cited by examiner

*Primary Examiner* — Thomas D Lee
(74) *Attorney, Agent, or Firm* — Venable LLP

(57) ABSTRACT

An image processing apparatus includes one or more processors that are configured to obtain image data obtained by optically reading an original image, to obtain a fluorescence light emission amount obtained by optically detecting a fluorescent color material in the original image, to estimate, based on the obtained fluorescence light emission amount, a color component attributable to the fluorescent color material in the obtained image data, the color component attributable to the fluorescent color material including a color component of reflected light in the fluorescent color material and a color component caused by emission when the fluorescent color material transitions from an excited state to a ground state, to separate a color component attributable to a subtractive color mixture color material from the obtained image data by using the estimated color component attributable to the fluorescent color material, and to output image data obtained by the separation.

8 Claims, 20 Drawing Sheets

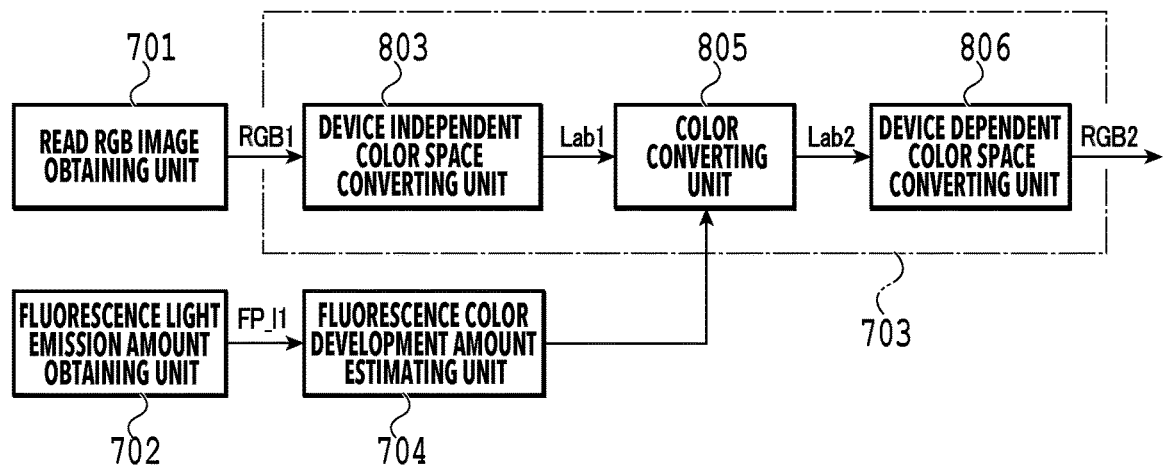
FIG.10A
FIG.10B
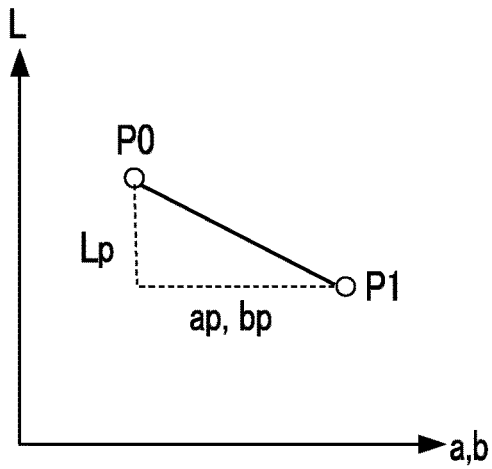
FIG.10C

IMAGE PROCESSING APPARATUS, IMAGE PROCESSING METHOD, AND STORAGE MEDIUM

CROSS-REFERENCE TO PRIORITY APPLICATION

This application claims the benefit of Japanese Patent Application No. 2022-075989, filed May 2, 2022, which is hereby incorporated by reference herein in its entirety.

BACKGROUND OF THE INVENTION

Field of the Invention

The present disclosure relates to an image processing apparatus, an image processing method, and a storage medium, in detail, color reproduction based on reading of an image printed with a fluorescent color material.

Description of the Related Art

As one type of such a technique, Japanese Patent Laid-Open No. 2007-121618 discloses a technique that handles mismatching between a tint of an original and a tint of a copied product due to metamerism in the case when a fluorescent color material is used. In usage of a fluorescent color material, there is sometimes a case when, in an image obtained by copying an original printed with the fluorescent color material, an original bright color cannot be reproduced due to a decrease in saturation or an original bright image cannot be reproduced due to wash-out and disappearance of a color with high lightness, or the like. To counter this, in Japanese Patent Laid-Open No. 2007-121618, whether each pixel in a read image belongs to a non-fluorescent region or not is determined, and a color toner and a fluorescent toner are used differently depending on the determination. Specifically, an image is printed with the color toner for an image region in which the pixels of the read image belong to the non-fluorescent region, while an image is printed with the color toner and the fluorescent toner for an image region in which the pixels do not belong to the non-fluorescent region.

However, in Japanese Patent Laid-Open No. 2007-121618, an image of a color in a region outside a region reproducible with the color toner is determined as an image belonging to a fluorescent region, and, in reading of this image, a light emission amount in the case when a fluorescent color material is excited and emits light is not determined or reflected in a reproduced image. In the case when a light emission component due to the fluorescent color material is not determined or reflected as described above, a fluorescent color is not sufficiently reproduced in the reproduced image.

SUMMARY OF THE INVENTION

An object of the present disclosure is to provide image processing that allows a light emission component due to excitation of the fluorescent color material to be determined and reflected in a reproduced image.

In a first aspect of the present disclosure, an image processing apparatus comprises: an image obtaining unit configured to obtain image data obtained by optically reading an original image, a light emission amount obtaining unit configured to obtain a fluorescence light emission amount obtained by optically detecting a fluorescent color material in the original image, an estimating unit configured to estimate a component attributable to light emission by the fluorescent color material in the obtained image data, based on the obtained fluorescence light emission amount, a correcting unit configured to correct the image data by using the estimated component attributable to light emission, and an output unit configured to output the corrected image data.

In a second aspect of the present disclosure, an image processing method comprises: based on a fluorescence light emission amount obtained by optically detecting a fluorescent color material in an original image, estimating a component attributable to light emission by the fluorescent color material in image data obtained by optically reading the original image, correcting the image data by using the estimated component attributable to light emission, and outputting the corrected image data.

In a third aspect of the present disclosure, a non-transitory computer-readable storage medium stores instructions that, when executed by a computer, cause the computer to perform an image processing method, the image processing method comprising, based on a fluorescence light emission amount obtained by optically detecting a fluorescent color material in an original image, estimating a component attributable to light emission by the fluorescent color material in image data obtained by optically reading the original image, correcting the image data by using the estimated component attributable to light emission, and outputting the corrected image data.

In a fourth aspect of the present disclosure, a reading apparatus comprises: an LED configured to perform irradiation with irradiation light that is visible light and that is light with a wavelength range in which a fluorescent color material in an original image is excited, a first sensor configured to detect a color development component in the original image, and a second sensor configured to detect light emission due to the fluorescent color material at a wavelength excluding the wavelength of the irradiation light.

Further features of the present invention will become apparent from the following description of exemplary embodiments with reference to the attached drawings.

BRIEF DESCRIPTION OF THE DRAWINGS

FIGS. 10A to 10C are diagrams explaining details of processing of a fluorescence color development amount correcting unit;

DESCRIPTION OF THE EMBODIMENTS

Embodiments of the present disclosure are described below in detail with reference to the attached drawings.

First Embodiment

Figure 1A:
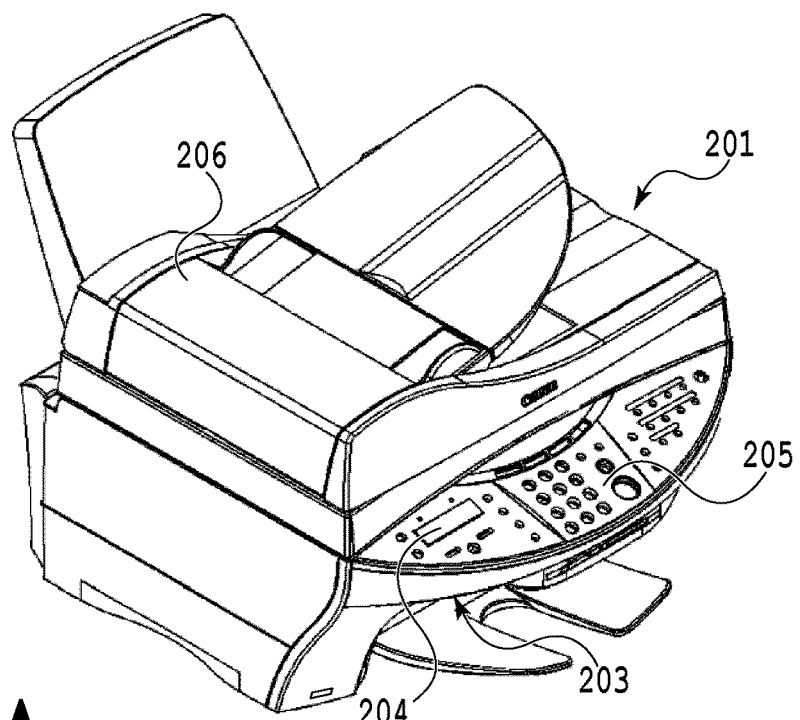
FIGS. 1A and 1B are perspective views illustrating a multi-function printer (MFP) according to one embodiment of the present disclosure.
Figure 1B:
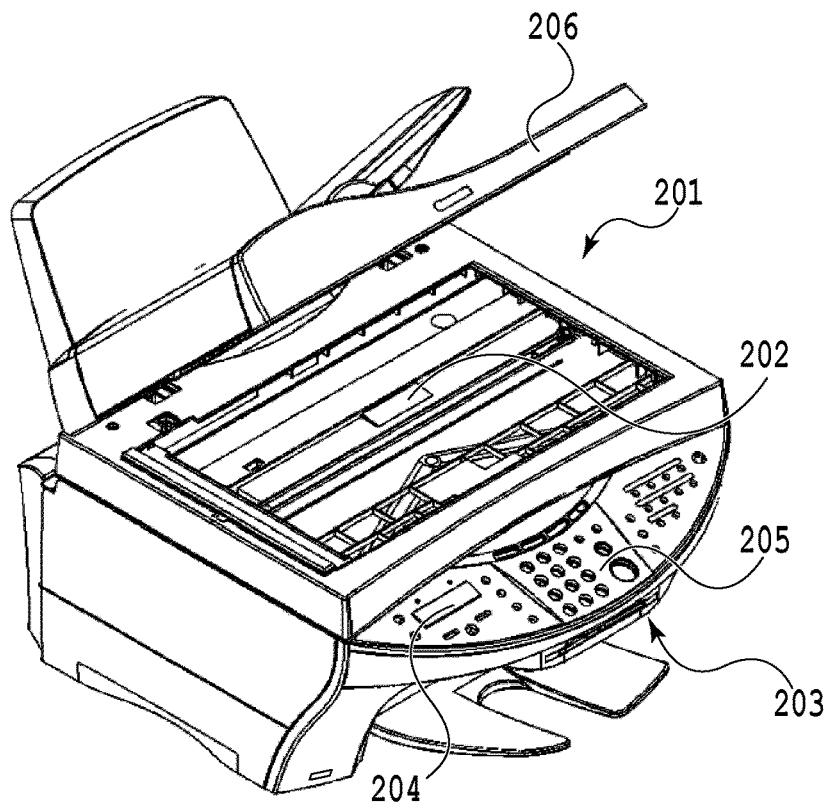

FIGS. 1A and 1B are perspective views illustrating a multi-function printer (MFP) according to one embodiment of the present disclosure, and illustrate a state when an original plate cover that also functions as an original feed mechanism is closed and a state where the original plate cover is opened, respectively.

The MFP 201 has a function as a printer (printing unit) that receives data from a host computer and performs printing and a function as a scanner (reading unit) that reads an original, and can operate in each of the single functions. Moreover, the MFP 201 has a copying function of causing the printer to print an image read by the scanner.

The MFP 201 includes a reading unit 202 with a flatbed scanner form that includes an original plate and a reading unit below the original plate, a printing unit 203 of an inkjet method that is arranged below the reading unit 202, and the original plate cover 206 that also functions as the original feed mechanism. Moreover, the MFP 201 includes a display unit 204 that displays an operation state of the MFP 201, and the like, and an operation unit 205 that includes various key switches and the like.

Figure 2A:
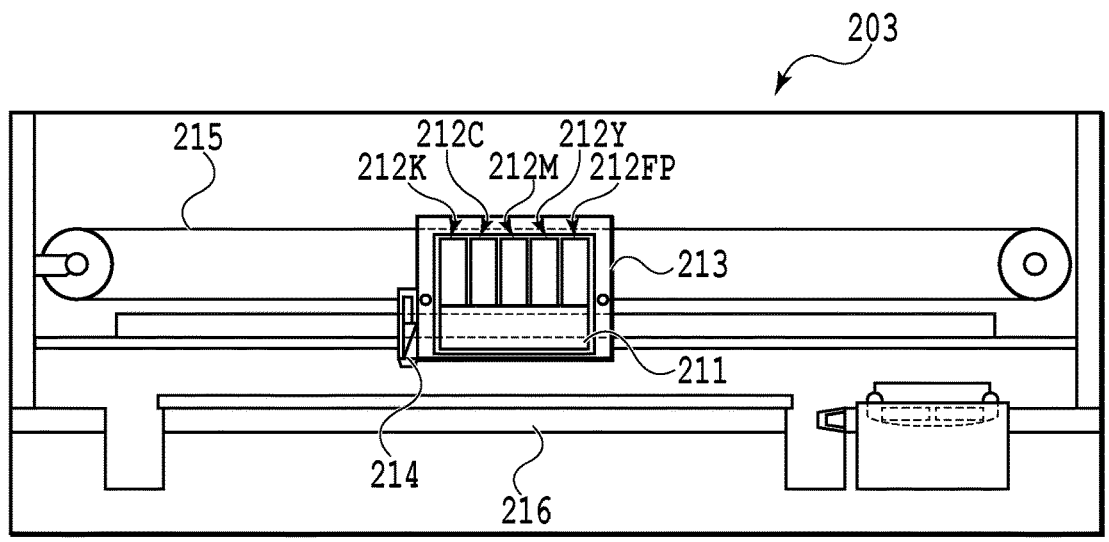
FIGS. 2A and 2B are diagrams illustrating a detailed configuration of a printing unit in the MFP.
Figure 2B:
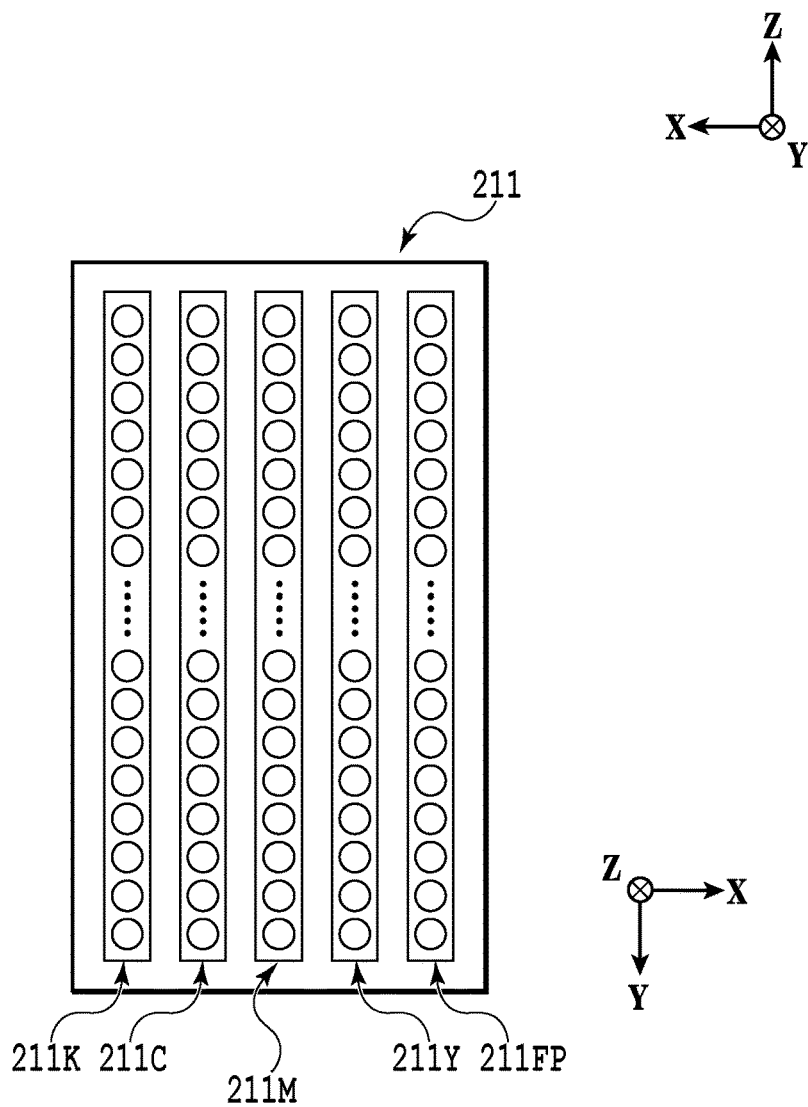

FIGS. 2A and 2B are diagrams illustrating a detailed configuration of the printing unit 203 in the MFP 201 illustrated in FIGS. 1A and 1B. FIG. 2A schematically illustrates a configuration of the printing unit 203, and FIG. 2B schematically illustrates print heads in the printing unit 203.

In FIG. 2A, print heads 211, ink tanks 212K, 212C, 212M, 212Y, and 212FP, and an optical sensor 214 are mounted on a carriage 213. Inks of black (K), cyan (C), magenta (M), yellow (Y), and fluorescent pink (FP) are housed in the ink tanks 212K, 212C, 212M, 212Y, and 212FP, respectively, and are supplied to the corresponding print heads depending on an ejection operation. The carriage 213 can move along the X direction in the drawings or in the opposite direction (scanning direction) by using drive force of a carriage motor (not illustrated) transmitted via a belt 215. The inks are ejected from nozzles of the print heads toward a print medium (−z direction in the drawings) based on print data while the carriage 213 moves in the scanning direction relative to the print medium. An image of one line corresponding to one scanning operation is thereby printed on the print medium on a platen 216. In the case when this one scanning operation is completed, the print medium is conveyed along a conveyance direction (−y direction in the drawings) by a distance corresponding to the width of one scanning operation. Such scanning and conveyance are alternately repeated and, for example, an image of one page can be thereby printed on the print medium. The optical sensor 214 performs a detection operation while moving together with the carriage 213 to detect whether a print medium is present on the platen 216 and to detect a special pattern on the print medium. The MFP 201 can thereby perform conveyance control of the print medium and determination of ejection failure of a nozzle, ejection misalignment, and the like.

FIG. 2B illustrates nozzle arrays in a view in which the print heads 211 are viewed from the apparatus upper side (+z direction). The print heads 211 include five nozzle arrays corresponding to the five types of inks. Specifically, in the present embodiment, five print heads corresponding to the five types of inks are integrally formed, and the corresponding inks are supplied to individual nozzles in the respective nozzle arrays via independent ink flow passages that are not illustrated. The five nozzle arrays include a nozzle array 211K corresponding to the K ink, a nozzle array 211C corresponding to the C ink, a nozzle array 211M corresponding to the M ink, a nozzle array 211Y corresponding to the Y ink, and a nozzle array 211FP corresponding to the FP ink. These five nozzle arrays are arranged at varying positions in the scanning direction, and the five types of inks can be thereby sequentially ejected for each pixel with the scanning of the print heads 211.

Application of the present disclosure is not limited to a printing unit or a printing apparatus of the inkjet method. For example, the present disclosure may be applied to a form of an electrophotographic method using toners as color materials. Moreover, image reproduction based on reading of an image is not limited to a form of print, and may be, for example, a display apparatus using liquid crystal display elements, LED elements, or the like.

Figure 3A:
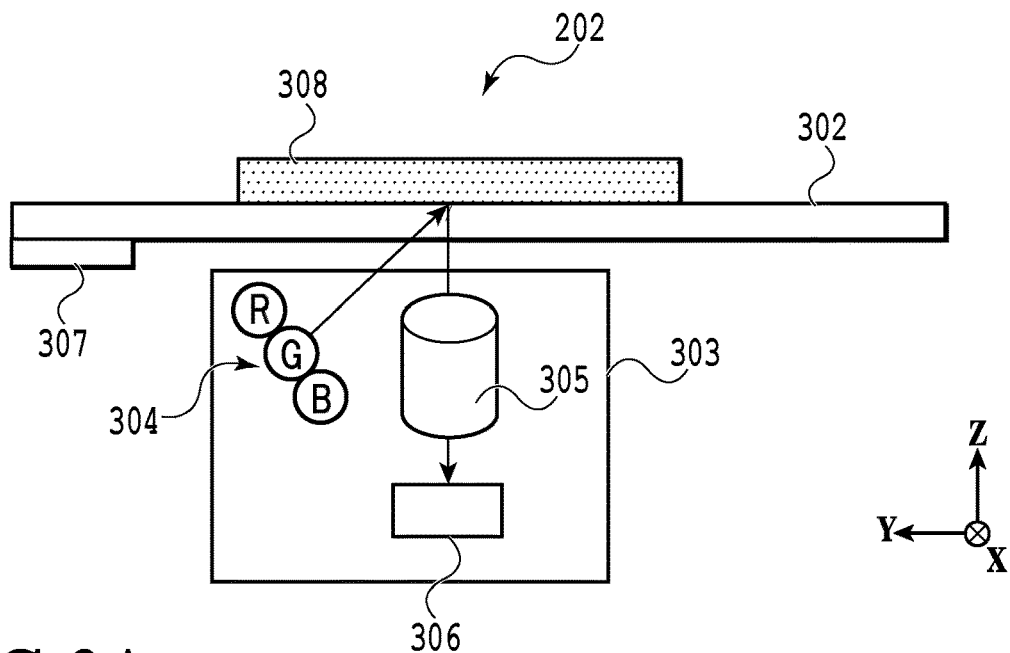
FIGS. 3A to 3C are diagrams explaining a reading unit in the MFP.
Figure 3B:
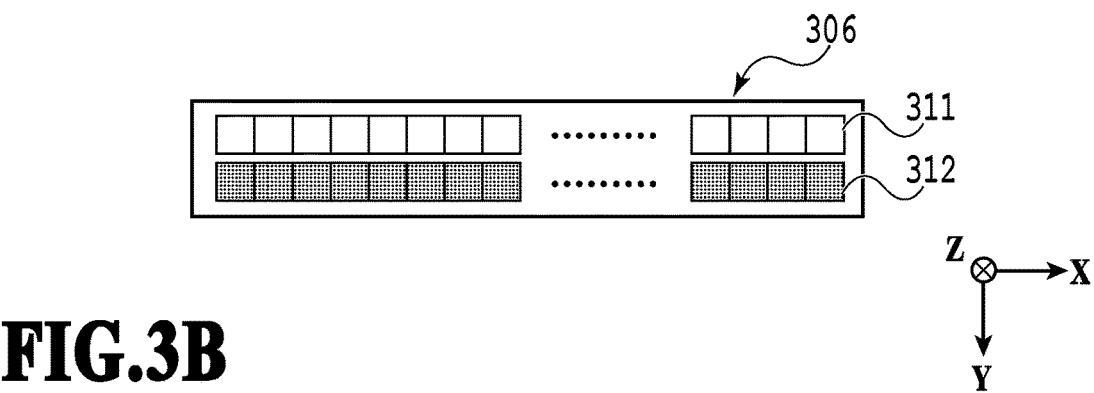
Figure 3C:
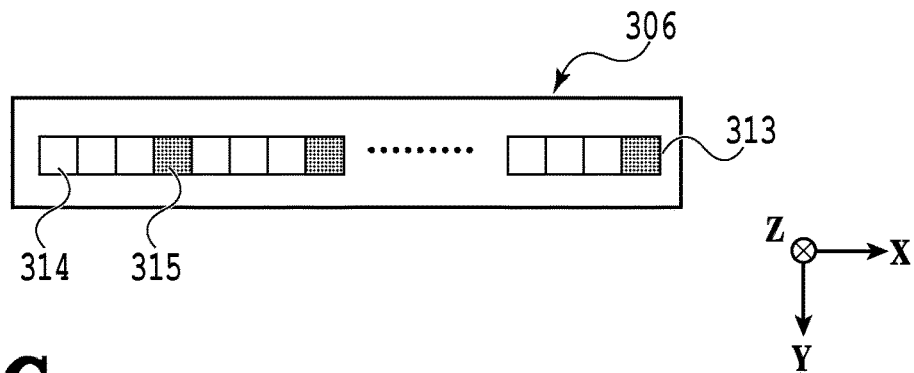

FIGS. 3A to 3C are diagrams explaining the reading unit 202 in the MFP 201 illustrated in FIG. 1B.

As illustrated in FIG. 3A, the reading unit 202 is configured to include an original glass plate 302 and a scanner unit 303. FIG. 3A illustrates a state when an original 308 is placed on the original glass plate 302 by a user or by being fed by the original feed mechanism. The scanner unit 303 includes light sources 304, a lens 305 for condensing light, and a sensor 306, and performs optical reading on an original image as described below. The light sources 304 are three LEDs that develop colors of red (R), green (G), and blue (B), respectively, in the present embodiment, and are arranged such that incident light is incident on the original at a fixed angle. Light reflected on the original 308 is condensed by the lens 305, and is detected by the sensor 306. The sensor 306 generates a read signal depending on the intensity of the received reflected light. Specifically, the R, G, and B light sources are sequentially turned on, and read signals of three channels of R, G, and B are generated based on signal values detected by the sensor at timings at which the R, G, and B light sources are turned on, respectively. The sensor 306 is arranged to detect the light reflected at an angle different from the incidence angle of the incident light. Specifically, the reading unit of the present embodiment reads scatted light instead of regular reflected light from the original. The scanner unit 303 can move in the Y direction in the drawings, and can scan an original region and a white reference plate 307 arranged below the original glass plate 302. The scanner unit 303 reads the white reference plate 307 as appropriate to correct the light sources and a detection error of the sensor.

FIG. 3B is a schematic diagram explaining a detailed configuration of the sensor 306. The sensor 306 of the present embodiment is configured to include a W (white) sensor array 311 and an R (red) sensor array 312. The W sensor array 311 and the R sensor array 312 are each an array in which a predetermined number of W sensors or R sensors are arranged in a direction (X) orthogonal to a read scanning direction (Y) of the scanner unit 303. An image region with width corresponding to sensor arrangement length can be thereby read in one read scanning operation. The read signals of three channels of R, G, and B are generated for each pixel in the image region by this read scanning operation. The arrangement pitch of the sensors in each sensor array is 600 dpi and, as a result, the resolution of the signals for the respective pixels detected by each of the sensor arrays 311 and 312 is 600 dpi.

The W sensors in the W sensor array 311 detect reflected light depending on the turn-on of each of the R, G, and B light sources as described in detail later in FIG. 9, and the like. The W sensors thereby generate the R, G, and B signals for each pixel in the read image. The R sensors in the R sensor array 312 detect only reflected light in a red wavelength range in the reflected light as described in detail later also in FIG. 9, and the like. The R sensors thereby generate signals corresponding to a light emission component of a fluorescent color material.

FIG. 3C is a schematic diagram illustrating another example of the sensor 306. In the sensor 306 of the present example, multiple W sensors and multiple R sensors form one sensor array 313. The sensor array 313 is an array in which the sensors are arranged at intervals of 600 dpi and, in this arrangement, a R sensor 315 is arranged after each set of three W sensors 314. The R sensors are thereby arranged at intervals of 150 dpi. Moreover, in this example, the entire sensor array 313 is formed of W sensors, and a red filter is applied to the W sensor arranged after each set of three W sensors described above to cause this W sensor to function as the R sensor (315). As a result, arrangement of W sensors and R sensors that have the same functions as the W sensors and the R sensors described above in FIG. 3B can be configured. For the reflected light detected by using the present sensor array, the W sensors 314 generate signals with a resolution of 600 dpi with absence at intervals of 150 dpi, and the R sensors 315 generate signals with a resolution of 150 dpi. The absent portions in the signals of the W sensors can be complemented by a publicly-known method.

Figure 4:
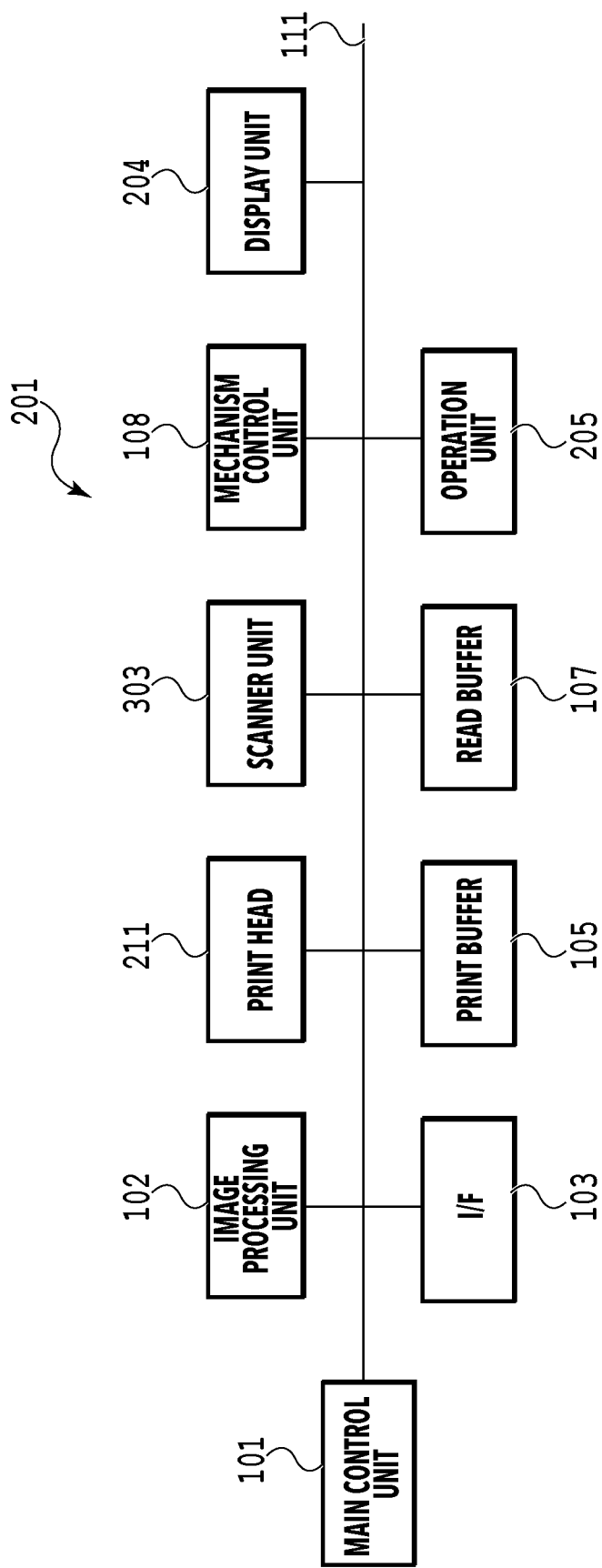
FIG. 4 is a block diagram illustrating configurations of control and data processing of the MFP.

FIG. 4 is a block diagram illustrating configurations of control and data processing of the MFP illustrated in FIGS. 1A and 1B.

In FIG. 4A, a main control unit 101 is a unit that controls the entire system of the MFP 201 including the elements described below, and is configured to include a CPU, a ROM, a RAM, and the like. An image processing unit 102 is formed of a CPU, a ROM, a RAM, and the like, and performs creation of an image and control of image data including print data generation based on read data to be described later in FIGS. 7 to 10C, and the like. A print buffer 105 can store the print data before supply to the print heads 211, as raster data. The print heads 211 include elements that generate energy for ejecting the inks for the respective nozzles, and the inks are ejected from the nozzles by driving the aforementioned elements according to the print data stored in the print buffer 105. A read buffer 107 stores image data read by the scanner unit 303 as described above. A mechanism control unit 108 performs various types of mechanism control such as conveying, feeding, and discharging of the print medium, moving of the carriage in which the print heads are mounted, moving of the scanner unit, and the like. The display unit 204 displays various pieces of information to the user and, for example, an LCD, or the like, can be used. The operation unit 205 is an operation unit on which the user performs operations and, for example, buttons or a touch panel can be used. A system bus 111 signal-connects the elements of the present system to one another. An interface (I/F) 103 is a connection portion to an external apparatus such as a PC, and printing, reading, and copying by an external apparatus are made possible by this connection.

The configurations described above with reference to FIG. 4 form an image processing apparatus that executes print data generation based on the read data described later in FIGS. 7 to 10C, and the like.

(Light Emission Characteristic of Fluorescent Color Material)

The fluorescent color material is a color material that is excited from a ground state by light of an exciting wavelength to go into an excited state and that generates visible light including a light emission component while returning from the excited state to the ground state. In the case when the fluorescent color material is excited, the fluorescent color material absorbs light and emits light (light emission component) with lower energy than the absorbed light (wavelength), that is, light with a longer wavelength.

Figure 5:
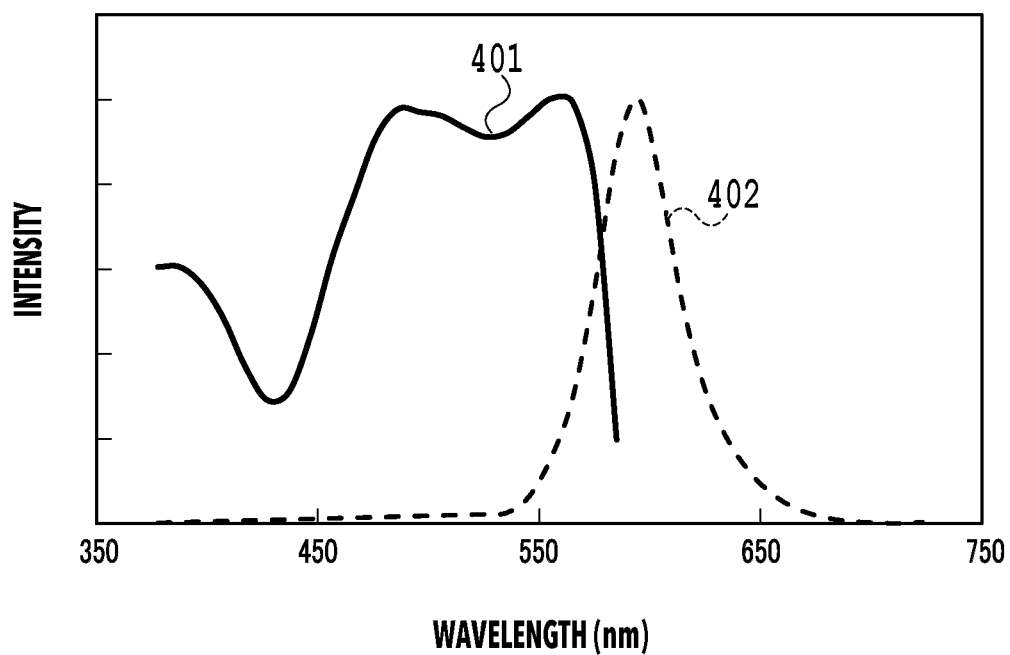
FIG. 5 is a diagram illustrating an intensity of excitation and an intensity of light emission according to the embodiment of the present disclosure in the case when a sample image printed with a fluorescent pink ink is irradiated with light.

FIG. 5 is a diagram illustrating an intensity of excitation 401 and an intensity of light emission 402 in the case when a sample image printed on a paper surface with the fluorescent pink ink is irradiated with light. In FIG. 5, the horizontal axis represents the wavelength of light, and the vertical axis represents the intensity. The excitation 401 indicates an intensity of excitation by irradiation light of each wavelength in the case when the wavelength of the irradiation light is changed within a range of about 380 nm to about 580 nm illustrated in FIG. 5. In detail, for the excitation 401, the intensity of excitation is measured with the irradiation light (wavelength) changed within the aforementioned range and with the sensitivity to the received light (wavelength) fixed. In other words, the excitation is such that the intensity is distributed over a certain wavelength range for irradiation light of one wavelength, but an intensity at a predetermined wavelength (600 nm in the example of FIG. 5) in this wavelength range is measured. Specifically, the intensity of excitation is measured by using a light receiver by adjusting the light receiver such that light-receiving sensitivity for wavelengths other than the predetermined wavelength is set to substantially zero by using a filter and only the intensity of a wavelength at which the light emission intensity is highest (around 600 nm in the present example) is detected. In the example illustrated in FIG. 5, for example, the intensity at about 570 nm that is the highest intensity of the excitation 401 indicates the intensity of the wavelength of 600 nm in intensity distribution in the case when the sample image is excited by light of about 570 nm. Meanwhile, the light emission 402 is light emission in which excitation that occurs in the case when a fluorescent pink sample image is irradiated with light of an exciting wavelength causes fluorescent pink to absorb light and to emit light with a longer wavelength than the absorbed light (wavelength). FIG. 5 illustrates the intensity of this light emission. Specifically, the light emission 402 illustrates an intensity in the case when a sample image printed with the fluorescent pink ink is irradiated with light of a blue (B) LED (in the example of FIG. 5, wavelength: about 480 nm).

As illustrated in FIG. 5, the wavelength range (wavelength range corresponding to the excitation 401) in which the fluorescent pink ink can be excited partially overlaps and is on the shorter wavelength side of the wavelength range (wavelength range corresponding to the light emission 402) in which the fluorescent pink ink emits light. Moreover, in the example of FIG. 5, it is indicated that the fluorescent pink color material of the present embodiment is excited by light of a wavelength of about 380 to about 580 nm, and this wavelength range is visible light. Since the fluorescent color material has a light emission component (emits light), reflectivity at a light emission wavelength exceeds one in many cases. In the present description, the color material with such a characteristic is referred to as "fluorescent color material" and an ink containing the fluorescent color material is referred to as "fluorescent ink". Meanwhile, a color material that only absorbs light of a predetermined wavelength in irradiation light and that does not emit light is referred to as "subtractive color mixture color material", and an ink containing the subtractive color mixture color material is referred to as "subtractive color mixture ink". Unlike the fluorescent ink, since the subtractive color mixture ink only absorbs light and does not emit light, the reflectivity does not exceed one.

(Composition of Fluorescent Ink)

A composition of the fluorescent ink usable in the present embodiment is as follows. In the present embodiment, the fluorescent ink produced by mixing a solvent, an activator, and a dispersion of a color material with a fluorescent characteristic is used. The dispersion of the fluorescent color material is a dispersion of the color material with the fluorescent characteristic described above. NKW-3207E (fluorescent pink water dispersion: Nihon Keikou Kagaku) and NKW-3205E (fluorescent yellow water dispersion: Nihon Keikou Kagaku) can be given as examples, and any dispersion of a color material with the fluorescent characteristic may be used.

The aforementioned fluorescent color material dispersion is combined with known solvent and activator, and is dispersed to form an ink. A dispersion method of the fluorescent color material dispersion is not limited to a particular method. For example, a fluorescent color material dispersion dispersed by a surfactant, a resin dispersed fluorescent color material dispersion dispersed by a dispersion resin, or the like, can be used. As a matter of course, fluorescent color material dispersions of varying dispersion methods can be used in combination. An anion surfactant, a non-ionic surfactant, a cation surfactant, or an amphoteric surfactant can be used as the surfactant. Any resin that is water-soluble or water-dispersible can be used as the dispersion resin. Among such resins, a dispersion resin with a weight-average molecular weight of 1,000 or more and 100,000 or less is particularly preferable, and a dispersion resin with a weight-average molecular weight of 3,000 or more and 50,000 or less is more preferable. For example, an aqueous medium containing water and an aqueous organic solvent is preferably used as the solvent.

(Relationships between Irradiation Light Wavelength and Each of Excitation and Light Emission Wavelength Relating to Fluorescent Color Material)

As described above, the fluorescent color material absorbs a specific wavelength in the irradiation light and emits light of a longer wavelength in the case when the fluorescent color material is excited by absorbing light, while outputting light of other wavelengths as reflected light of the same wavelengths without absorbing it. In the present description, a light component of the reflected light out of these types of light is referred to as "color development" or "color development component", and a light component that is outputted by the excitation and that is shifted to a different longer wavelength is referred to as "light emission" or "light emission component". A normal subtractive color mixture color material reflects light of a color development component while the fluorescent color material generates a light emission component of a specific wavelength in addition to a color development component. Note that, in the fluorescent color material, since a light emission component amount and a color development component amount are correlated to each other, an amount of color development of the fluorescent color material can be estimated from an amount of light emission as described later.

FIGS. 6A to 6D are diagrams explaining relationships between the irradiation light wavelength and each of the excitation and the light emission wavelength related to the fluorescent pink ink used in the present embodiment.

Figure 6A:
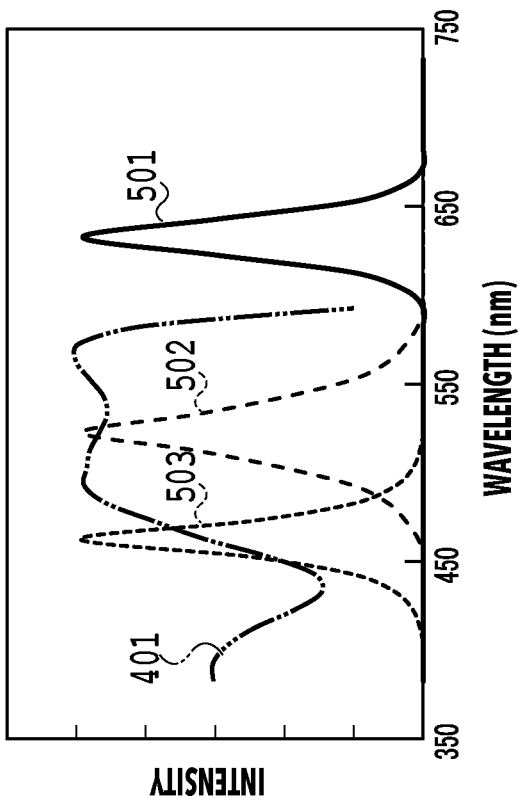
FIGS. 6A to 6D are diagrams explaining relationships between an irradiation light wavelength and each of excitation and a light emission wavelength related to a fluorescent pink ink used in the present embodiment.
Figure 6C:
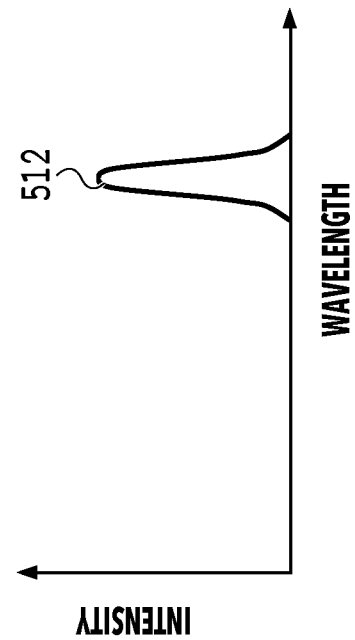
Figure 6B:
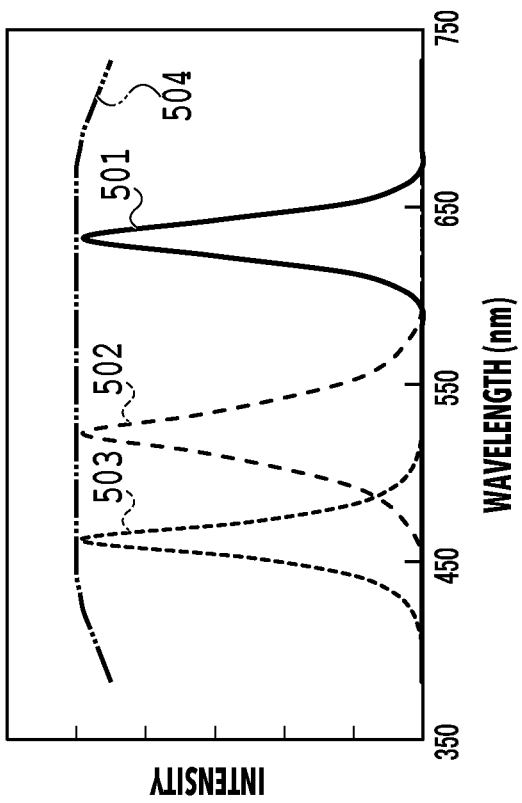
Figure 6D:
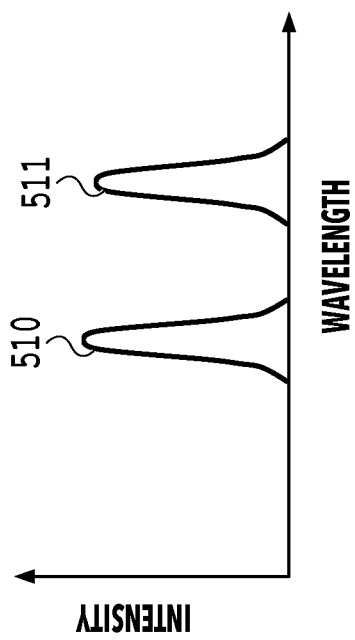

FIG. 6A illustrates relationships between light emission wavelengths of light source LEDs and sensitivity of the W sensor that receives light in the reading unit 202 used in the present embodiment. Note that relationships for the R sensor in the reading unit 202 are not illustrated. Specifically, contents described later in relation to the FIGS. 6B to 6D are description of the case when there is assumed to be no R sensor. In FIG. 6A, the horizontal axis represents a wavelength of light, and the vertical axis represents a light emission intensity for the LEDs and a light-receiving sensitivity for the sensor. Reference sign 501 denotes a light emission intensity of an R-LED that outputs red (R) light, reference sign 502 denotes a light emission intensity of a G-LED that outputs green (G) light, and reference sign 503 denotes a light emission intensity of a B-LED that outputs blue (B) light. In the case of the illustrated example, the peak wavelengths of the respective light emission intensities are present at B: about 460 nm, G: about 520 nm, and R: about 630 nm. Wavelength ranges of the light emission by these LEDs are in the wavelength range of visible light. Moreover, a light-receiving sensitivity 504 of the W sensor in the present embodiment is substantially uniform over the entire light emission range of the LEDs.

In a system including R, G, and B-LEDs as in the present embodiment, there is used a sequential turn-on method in which the LEDs of R, G, and B are turned on sequentially and a light amount detected by the W sensor in the case when each of the LEDs is turned on is used as a signal value of a corresponding one of the R, G, and B channels. A value obtained by converting the light amount detected while the R-LED is turned on to a digital value is the signal value of the R-ch (channel). Similarly, a value obtained by converting the light amount detected while the G-LED is turned on to a digital value is the signal value of the G-ch, and a value obtained by converting the light amount detected while the B-LED is turned on to a digital value is the signal value of the B-ch. The signal values of R, G, and B ch for one pixel can be obtained by turning on the LEDs of R, G, and B sequentially and detecting the light amounts with the W sensor, as described above. In the case of the normal subtractive color mixture color material, light of a wavelength with which the color material is irradiated is reflected or absorbed depending on the color material, and light emission on the longer wavelength side as in the aforementioned fluorescent color material does not occur. Specifically, in the subtractive color mixture color material, the read signal values are defined on the assumption that the wavelength of the irradiation light and the wavelength of the light obtained by detecting the irradiation light are the same.

Meanwhile, in the case of the fluorescent color material, the light emission occurs on the longer wavelength side of the wavelength of the irradiation light. FIG. 6B illustrates relationships among the light emission wavelengths 501, 502, and 503 of the light source LEDs and the excitation 401 of the fluorescent pink color material in the reading unit 202 used in the present embodiment. The excitation 401 is the excitation described above in FIG. 5.

As illustrated in FIG. 6B, the light emission wavelength ranges 503 and 502 of the B-LED and the G-LED overlap the wavelength range that causes the excitation 401. Meanwhile, the light emission wavelength range 501 of the R-LED substantially has no overlapping with the wavelength range that causes the excitation 401. This means that the fluorescent pink color material is excited and emits light near about 600 nm (see FIG. 5) by irradiation of the B-LED and the G-LED and that the fluorescent pink color material is substantially not excited and does not emit light by the irradiation of the R-LED. Moreover, 600 nm is generally a wavelength within the wavelength range of "red".

FIG. 6C illustrates the wavelengths and the intensities of the reflected light and the light emission in the case when an image of the fluorescent pink color material is irradiated with the light of the G-LED. As in FIG. 6B, and the like, the horizontal axis represents the wavelength of light, and the vertical axis represents the intensity. In the case when the reflected light and the light emission are detected by one sensor (W sensor) as described above in FIG. 6A, reflected light 510 due to the irradiation of the G-LED and light emission 511 from the fluorescent pink due to the irradiation of the G-LED are detected by the one sensor, and the signal of G-ch is generated. The signal of G-ch corresponds to an integral of detected light. In this case, since the light emission component 511 in the red region is present, the light emission component 511 in the red region is added to the read signal of G-ch in addition to the color development component 510 in the green region. The light emission component in the red region is also added as the output of B-ch also in the case where the irradiation is performed by the B-LED. Meanwhile, FIG. 6D illustrates a wavelength range of the reflected light generated by the irradiation of the R-LED. Since the wavelength range by the R-LED has substantially no overlapping with the wavelength range that causes excitation of the fluorescent pink color material, no light emission occurs even if the R-LED performs irradiation. Accordingly, the light amount detected by the W sensor in the case where the R-LED performs irradiation is only the light 512 of the color development component that is reflected on the fluorescent pink color material without being absorbed in the wavelength range of the R-LED, and the color development component in the red wavelength range alone is the signal value of R-ch.

Regarding the relationships between the irradiation light wavelength and each of the excitation and the light emission wavelength of the fluorescent color material described above, in the case when an original image using the fluorescent color material is viewed with the human eyes, the light emission component generated by the excitation is viewed in addition to the color development component for the entire wavelength range of incident light. This makes the original of the fluorescent color material appear bright. Meanwhile, in reading to which the method of present disclosure is not applied and which involves no light reception of the R sensor, the light emission component in the red region is added to the read signal in addition to the color development component of the green or similar addition occurs as described above, and the light emission component itself cannot be individually determined and obtained, or the light emission component cannot be obtained by using only the color development component of red. As described above, in the reading of an image using the fluorescent color material, the light emission component of the fluorescent color material cannot be determined. Moreover, color materials cannot be adjusted depending on the light emission component, and a reproduced image based on this reading becomes an image with low saturation. In such a case, it is impossible to distinguish an original image that uses the fluorescent color material as the read image but whose saturation has become low in the reading stage, from an original image with low saturation that uses no fluorescent color material and that is formed by applying a small amount of subtractive color mixture color material.

Meanwhile, in the embodiment of the present disclosure, the R sensor (see FIGS. 3B and 3C) is prepared separately from the W sensor to detect the light emission near about 600 nm that occurs in the case when the fluorescent pink image included in the print image is irradiated with the B-LED or the G-LED. Image reading of the present embodiment including this detection of light emission and image processing based on this image reading are described below.

(Determination of Color Development Component Due to Fluorescent Color Material and Reflection Thereof on Reproduced Image)

Figure 7:
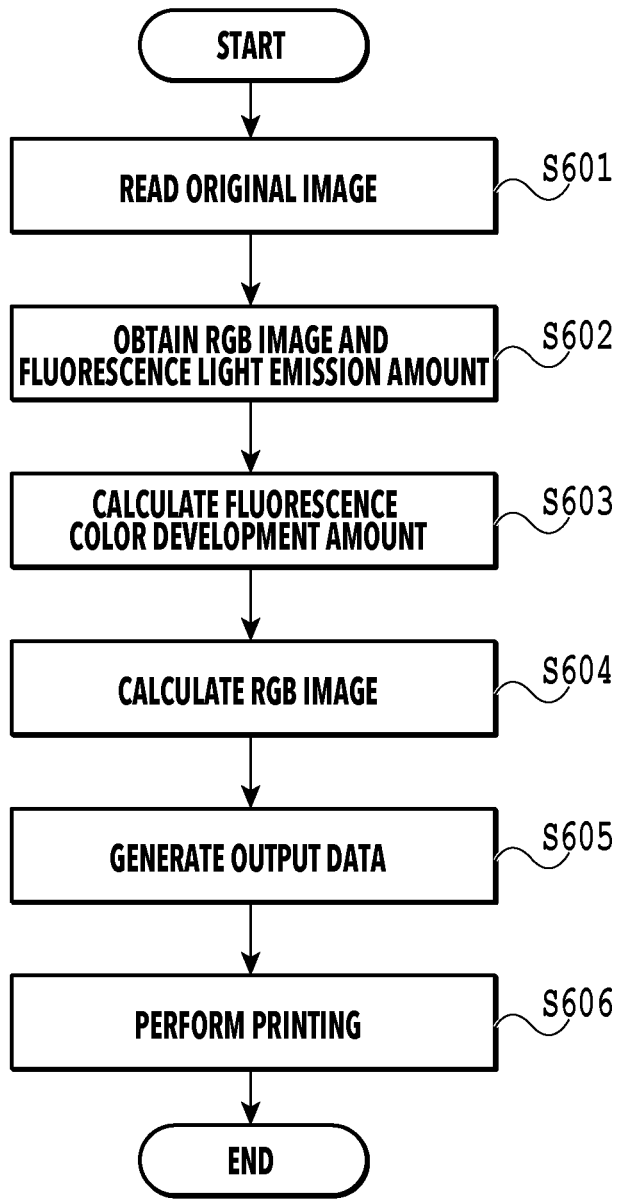
FIG. 7 is a flowchart explaining image reading and image processing based on the image reading according to the embodiment of the present disclosure.

FIG. 7 is a flowchart describing image reading and image processing based on the image reading according to the embodiment of the present disclosure.

A user gives a copy start instruction through an operation on the operation unit 205 or the like to activate the present processing. Specifically, the main control unit 101 performs control to drive the reading unit 202 and read an original image (S601). In this reading operation, the W sensors obtain an RGB image, and the R sensors obtain a fluorescence light emission amount (S602).

Next, the image processing unit 102 calculates a fluorescence color development amount (color development component) from the fluorescence light emission amount (light emission component) as described later in FIG. 8 and beyond (S603). Moreover, an RGB image of a read result is calculated and determined by using the calculated fluorescence color development amount (S604), and the image processing unit 102 generates output data from the determined RGB image and the fluorescence light emission amount (S605). Note that, in the present embodiment, this output data is print data for performing printing in the printing unit 203. Lastly, the print data is outputted to the printing unit 203 to perform printing (S606).

Figure 8:
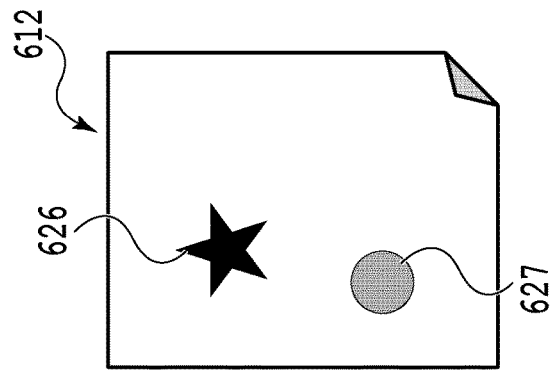
FIG. 8 is a diagram explaining an original image, a read image, and a calculated image.
Figure 8:
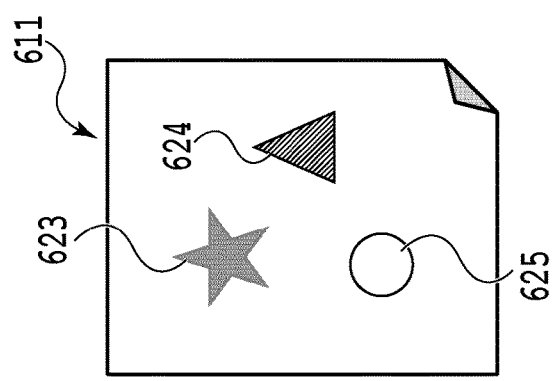
Figure 8:
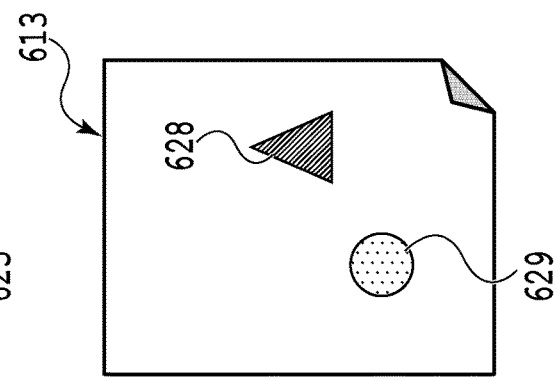
Figure 8:
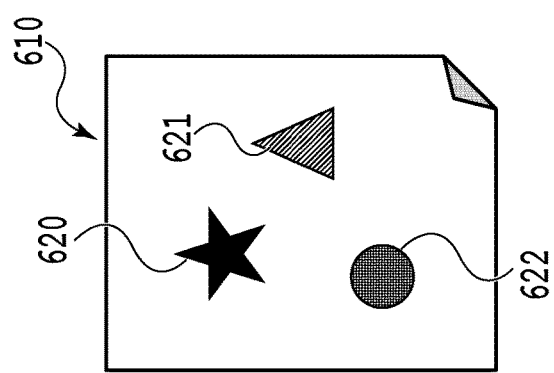

FIG. 8 is a diagram explaining the original image, the read image, and the calculated image according to the processing illustrated in FIG. 7.

An original 610 before the reading includes a pink region 620 printed with the fluorescent pink color material, a magenta region 621 printed with a magenta color material that is the subtractive color mixture color material, and an orange region 622 printed with the fluorescent pink color material and a subtractive color mixture yellow color material.

An image 611 is an RGB image obtained by reading the original 610, and an image 612 is a fluorescence light emission amount image obtained by also reading the original 610. Specifically, the RGB image 611 is an image formed of read signals of three channels of R-ch, G-ch, and B-ch, while the fluorescence light emission amount image 612 is an image formed of signals of one channel indicating the magnitude of the fluorescence light emission amount.

In the RGB image 611, a read image 623 of the pink region is an image of a pink color with low saturation that includes no light emission component of fluorescence in the R-ch. A read image 625 of the orange region is similarly an image of an orange color with low saturation. This is due to the light sources and the sensor in the reading unit and the shifting of light emission wavelength of fluorescence as described above in FIGS. 6A to 6D. Since the light emission component of fluorescence excited by the light sources has a light emission wavelength different from the wavelengths of the light sources, light cannot be correctly received by the sensor, and the saturation of the read image resultantly decreases. Meanwhile, since a read image 624 of the magenta region has no fluorescence component, a saturation decrease due to reading as described above does not occur. As described above, the contents of the RGB image 611 that are the read result itself are image data in which the original light emission of the fluorescent color material is not reflected.

Moreover, processing of directly converting the RGB image 611 to ink amount data that is printable by the printing unit also causes a decrease in saturation in a printed image due to the same reason. Specifically, the fluorescent pink region and the orange region in which the fluorescent pink and the subtractive color mixture yellow are mixed are mapped to a printer gamut and color-converted while remaining as images with low saturation, and are then further converted to ink amounts, and an image having saturation remaining at a low level is reproduced.

In the fluorescence light emission amount image 612, an image 626 and an image 627 corresponding to light emission amounts in the pink region and the orange region are obtained. The light emission amounts each depends on a color material amount used in the read original. Since the magenta region 621 uses no fluorescent color material, a signal value is zero.

In the embodiment of the present disclosure, the light emission component due to the fluorescent color material is determined and, based on the determined light emission component, correction of separating the color development component due to the subtractive color mixture color material and the color development component due to the fluorescent color material from each other and correction of adding color material data corresponding to the light emission component are performed (S603 and S604 of FIG. 7). As a result, a decrease in saturation in the read image or the print image is prevented from occurring.

Specifically, since the RGB image 611 include the color development component due to the subtractive color mixture color material and the color development component due to the fluorescent color material in a mixed manner, the color development component of the fluorescent color material is subtracted from the RGB image 611 to separate an image including only the color development component of the subtractive color mixture color material. The color development component due to the fluorescent color material in each of the regions in the RGB image 611 is calculated from the signal value of the light emission amount in the corresponding region of the fluorescence light emission amount image 612.

A subtractive color mixture color material image 613 is an image of a result of subtraction of the color development component of the fluorescent color material from the RGB image 611. Since the pink region 620 of the original image 610 uses only the fluorescent pink, in the subtractive color mixture color material image 613, a region corresponding to the pink region 620 becomes "white" as a result of the subtraction. Moreover, for the orange region 622 of the original image 610, only a component of the subtractive color mixture yellow is left, and a yellow image 629 is formed. For the magenta region 621, since there is no color mixing of the fluorescent color material, the magenta color development component is left as it is, and a magenta image 628 is formed. The subtractive color mixture color material image 613 and the fluorescence light emission amount image 612 obtained as described above are converted to print data used for printing in the printing unit. Each of the regions is thereby printed by using appropriate types and amounts of inks. As described later, the subtractive color mixture color material image 613 is printed by mainly using the subtractive color mixture ink, and the fluorescence light emission amount image 612 is preferably printed by using the fluorescent ink.

Figure 9:
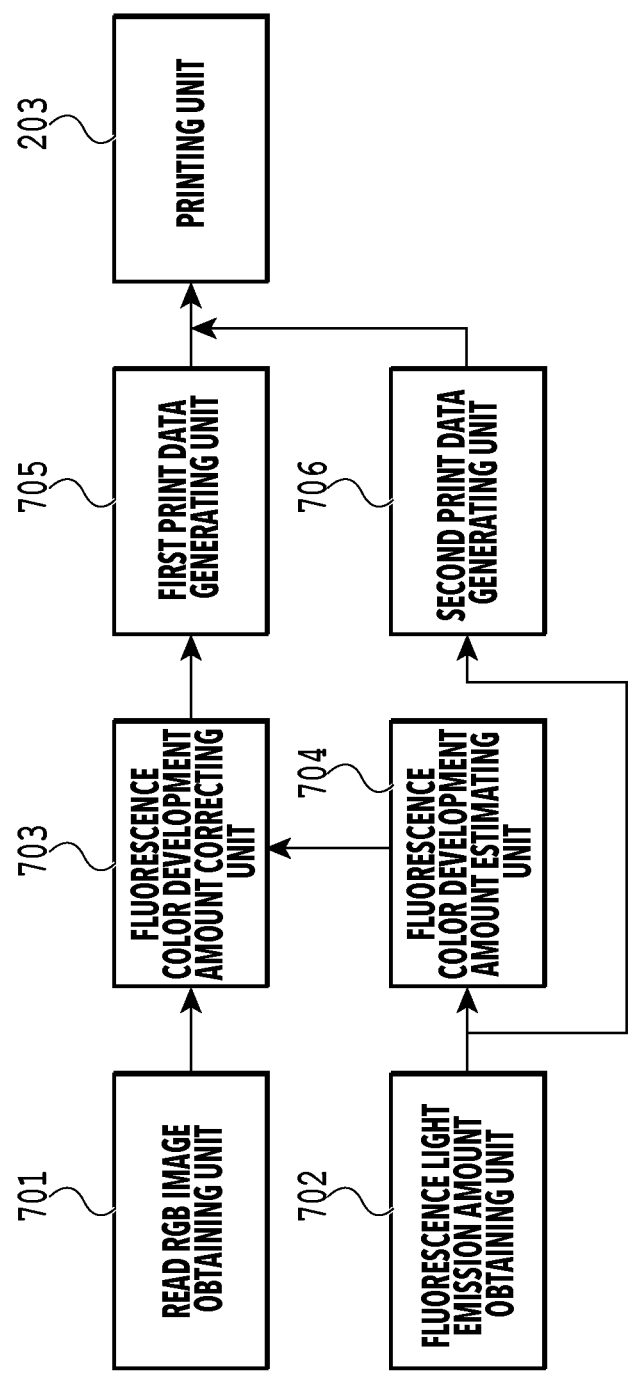
FIG. 9 is a diagram illustrating functional blocks in separation processing in the read image and print data generation based on the separation processing according to the embodiment of the present disclosure.

FIG. 9 is a diagram illustrating functional blocks in the separation processing in the read image and the print data generation based on the separation processing described above (S603 and S604 in FIG. 7).

A read RGB image obtaining unit 701 obtains images of three channels of R, G, and B through the reading operation of the reading unit 202 performed on the original image. Specifically, with reference to FIG. 4, the read RGB image obtaining unit 701 causes the scanner unit 303 to operate via the mechanism control unit 108 according to a copy operation start command received via the operation unit 205, under control of the main control unit 101. In this reading operation, the R-LED, the G-LED, and the B-LED are turned on by the sequential turn-on method, and the W sensors in the scanner unit 303 sequentially detect the color development components of R, G, and B of the original image while the respective LEDs are turned on. The R, G, and B images formed of signals of three channels are thereby generated. The read R, G, and B images are accumulated in the read buffer 107.

Moreover, a fluorescence light emission amount obtaining unit 702 similarly detects the light emission amount (light emission component) of the fluorescent color material through the reading operation of the reading unit 202, and generates light emission amount data of one channel. In this reading operation, the R sensors in the scanner unit 303 detect the light emission component at a timing of turn-on of the G-LED in the aforementioned sequential turn-on method. The fluorescence light emission amount obtained as described above is accumulated in the read buffer 107 like the RGB image. Note that the timing at which the R sensors detect the light emission component may be a timing of turn-on of the B-LED having the wavelength range capable of exciting the fluorescent pink color material like the G-LED.

A fluorescence color development amount estimating unit 704 estimates the color development amount due to the fluorescent color material, from the obtained fluorescence light emission amount. Then, a fluorescence color development amount correcting unit 703 corrects the read RGB image by using the estimated fluorescence color development amount, and generates a corrected RGB image. The estimated color development amount (color development component) described above is a component attributable to the light emission of the fluorescent color material, and the fluorescence color development amount correcting unit 703 subtracts this color development component from the read RGB image to generate an RGB image from which an effect of the light emission of the fluorescent color material is eliminated.

A first print data generating unit 705 then converts the corrected RGB image to first print data. Furthermore, a second print data generating unit 706 generates second print data from the fluorescence light emission amount obtained by the fluorescence light emission amount obtaining unit 702. The pieces of print data generated in the first and second print data generating units 705 and 706 are accumulated in the print buffer 105 (see FIG. 4). The printing unit 203 performs printing based on print data obtained by overlaying the pieces of print data generated in the first and second print data generating units one on top of the other.

Processes of the functional blocks described above are described in further detail with reference to FIG. 9.

The read RGB image obtaining unit 701 sequentially turns on the RGB-LEDs, and obtains the RGB image formed of signal values of three channels of R, G, and B obtained by converting the light received by the W sensors in the turn-on of the RGB-LEDs to digital signals.

The fluorescence light emission amount obtaining unit 702 obtains the image signal of one channel obtained by converting the light received by the R sensors while the G-LED is turned on to digital signals. As in the aforementioned description, the fluorescent pink color material is excited by the light in the wavelength range of the G-LED, and emits light in the red region. Accordingly, the amount of light received by the R sensors by turning on the G-LED is set as the light emission amount. Since the color development amount due to the normal absorption/reflection in the turn-on of the G-LED is in the green region, no light corresponding to this color development amount is received by the R sensors, and only the light emission amount can be extracted. The obtained light emission amount signal is the signal of one channel indicating the intensity of the fluorescence light emission amount for each region in the original image.

The fluorescence color development amount estimating unit 704 estimates the fluorescence color development amount from the fluorescence light emission amount. Since the fluorescence light emission amount is correlated to a fluorescent color material amount, the fluorescent color material amount can be estimated from the fluorescence light emission amount, and the fluorescence color development amount can be estimated from the estimated fluorescent color material amount. Note that the original image includes a print image obtained by offset printing, a print image formed by an inkjet printer, a print image obtained by an electrophotographic method, an image in which marking is made with a highlighter, and the like. A print ink used in the offset printing, an ink used in the inkjet printer, and an ink used in the highlighter have similar excitation-light emission wavelength characteristics, provided that the used color materials are the same.

The fluorescence color development amount correcting unit 703 corrects the read RGB image obtained by the reading, depending on the fluorescence color development amount. Specifically, the read RGB image include both of the color development component due to the subtractive color mixture color material and the color development component due to the fluorescent color material in a mixed manner. Subtracting the color development component due to the fluorescent color material from the RGB image separates only the color development component of the subtractive color mixture color material.

FIGS. 10A to 10C are diagrams explaining details of the processing of the fluorescence color development amount correcting unit 703, and FIG. 10A illustrates functional blocks of the fluorescence color development amount correcting unit 703.

The image obtained by the read RGB image obtaining unit 701 is formed of image signals of three channels with eight bits for each color, and a value for one pixel in this image data is referred to as RGB1. Meanwhile, the light emission amount obtained by the fluorescence light emission amount obtaining unit 702 is a one-channel signal, and may take a value from 0 to 100. This value is such a digital value that the closer the value is to 100, the larger the light emission amount is, and 0 means that no light is emitted. The light emission amount for the same pixel as RGB1 is referred to as FP_l1.

A device independent color space converting unit 803 converts the image data RGB1 obtained by the read RGB image obtaining unit 701 to data of a device independent color space. The device independent color space is, for example, the ($L^*$, $a^*$, $b^*$) color space specified in CIE 1976. The signal value RGB1 of the pixel is converted to a value of the device independent color space, and becomes Lab1.

Meanwhile, the fluorescence color development amount estimating unit 704 estimates the fluorescence color development amount dependent on the fluorescent color material amount, based on the light emission amount FP_l1 obtained by the fluorescence light emission amount obtaining unit 702, and determines a color difference (Lp, ap, bp) of a color that varies depending on presence or absence of the corresponding fluorescent color material.

FIG. 10B is a diagram explaining the estimation of the fluorescence color development amount by the fluorescence color development amount estimating unit 704. The estimation of the fluorescence color development amount is performed by using a look-up table (LUT) that is provided in advance and that is defined such that the fluorescence light emission amount FP_l1 is an input and the corresponding color development amount is an output. The table 1 is a table in which the fluorescence light emission amounts FP_l1 of 0 to 100 are divided into 11 levels and defined. The table 2 is a table in which a color development amount (Lp, ap, bp) is defined for each value of the fluorescence light emission amount defined in the table 1, and the color development amount is indicated by values in the CIE Lab color space. For example, in the case when the fluorescence light emission amount FP_l1 is "10", the amount (L1, a1, b1) of the color development component of the fluorescent color material is outputted as a color development amount estimation value.

In this case, the fluorescence color development amount (Lp, ap, bp) is an amount of change in the color development between the case when the fluorescent color material is applied and the case when no fluorescent color material is applied. FIG. 10C is a diagram explaining this amount of change in the color development. FIG. 10C illustrates a CIE Lab color space, the vertical axis represents L, and the horizontal axis represents a distance from a L axis on an ab plane, that is saturation. The point P0 is a color for which no fluorescent color material is applied, and the point P1 is a color for which a predetermined amount of fluorescent color material is applied. Specifically, a color difference between the point P0 and the point P1 is a color development component contributed by the predetermined amount of fluorescent color material forming the color of the point P1. The table 2 is a table obtained based on a color development difference between the case when the fluorescent color material is applied and the case when no fluorescent color material is applied, for each of the amounts of the fluorescent color material that achieve the fluorescence light emission amounts FP_l1 of 0 to 100, respectively. The table 2 is a one-dimensional (1D) LUT of each of L, a, and b with respect to FP_l1.

Lab1 obtained by the device independent color space converting unit 803 by converting the read RGB image to the device independent color space is a color that includes the color development component due to the subtractive color mixture color material and the color development component due to the fluorescent color material in a mixed manner. Accordingly, a color converting unit 805 subtracts the fluorescence color development amount (Lp, ap, bp), estimated based on the fluorescence light emission amount by the fluorescence color development amount estimating unit 704, from Lab1. Only the color development component due to the subtractive color mixture color material is thereby extracted. Note that Lp, ap, and bp may each take a positive value or a negative value. For example, in the case when mixing of the fluorescent color material causes the color to shift in a positive direction of a, subtracting the color development component means reducing the value of a. Meanwhile, in the case when the mixing causes the color to shift in a negative direction of a, the subtracting means increasing the value of a. Furthermore, although the input values are discrete values in the table 1, an output value for an input value between these discrete values may be calculated by using a publicly-known interpolation method.

Note that the aforementioned table 2 may be prepared for each level of lightness L in the read image, individually. This is because the color development amount varies between a bright color and a dark color even in the case when the same amount of fluorescent color material is applied and the fluorescence light emission amount is the same. The color development amount is smaller in the case when the fluorescent color material is laid on a dark color.

With reference to FIG. 10A again, the color converting unit 805 corrects the value Lab1 in the device independent color space by using the estimated fluorescence color development amount (Lp, ap, bp) as described above, and generates Lab2. A device dependent color space converting unit 806 further converts the value Lab2 in the device independent color space to a value RGB2 in a device dependent color space. Note that a publicly-known sRGB color space definition, adobe RGB color space definition, and the like, may be used for the conversion between the device dependent color space and the device independent color space. Moreover, the device independent color space is not limited to Lab described above. For example, a YCC space formed of luminance and color difference or an LCH indicating lightness, chroma, and hue can be also used. Furthermore, if the fluorescence color development amount is defined as RGB signal values, signal values of the respective RGB channels in the read RGB signals may be directly corrected without conversion to the device independent color space.

Figures 11A, 11B:
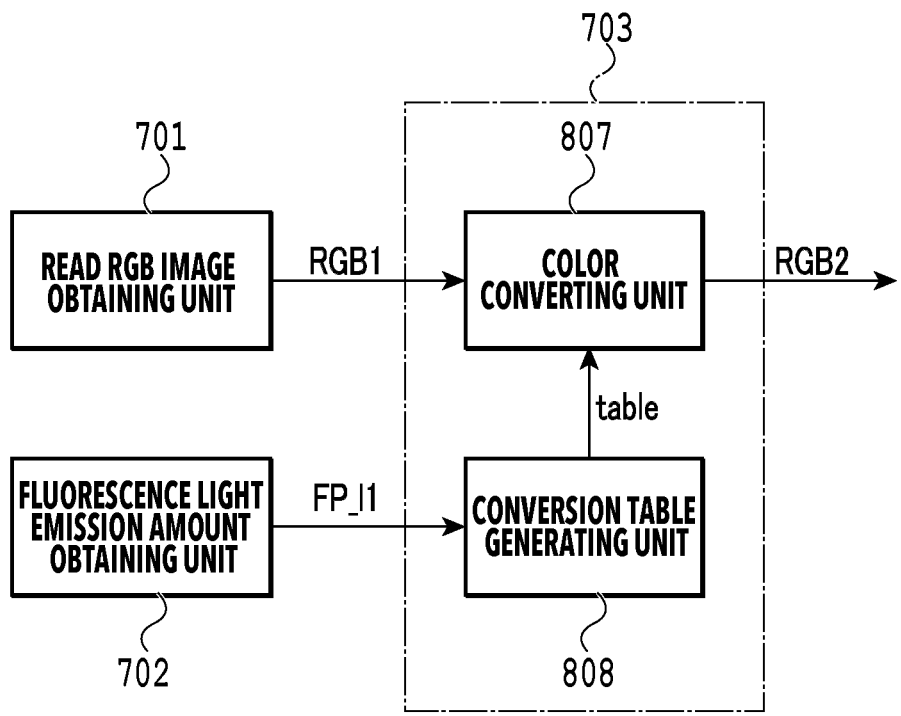
FIGS. 11A and 11B are diagrams illustrating another example of a configuration of the fluorescence color development amount correcting unit.

FIGS. 11A and 11B are functional block diagrams illustrating another example of the fluorescence color development amount correcting unit 703.

The present example is an example in which the function of the fluorescence light emission amount correction described above in FIGS. 10A to 10C is implemented by using tables. As illustrated in FIG. 11A, a conversion table generating unit 808 generates a table that converts RGB1 to RGB2 depending on the obtained fluorescence light emission amount, and a color converting unit 807 executes color conversion by using the generated table. Accordingly, in comparison to the example illustrated in FIGS. 10A to 10C, in the present example, the signal value RGB1 of the obtained image is not converted to the device independent color space, and the color converting unit 807 performs color conversion by using a 3D-LUT generated in the conversion table generating unit 808. Moreover, the fluorescence color development amount is reflected in the contents of the table generated in the conversion table generating unit 808, instead of being directly estimated from the fluorescence light emission amount FP 11.

FIG. 11B illustrates an example of the 3D-LUT used by the color converting unit 807. This table has such a form that the table 4 specifies an output RGB value corresponding to each of input RGB values specified by the table 3. In detail, in the table 3, signal values of 0 to 255 of each of R, G, and B are allocated to 16 levels at intervals of 17, the RGB signal values are expressed by combinations (hereinafter, referred also to as lattice points) of (R, G, B) of the allocated values, and 16×16×16 lattices points from black (0, 0, 0) to white (255, 255, 255) are specified. The table 4 is a table in which, for each of the rows in the table 3, that is each of the input values described by the lattice points (combinations of R, G, and B values), a combination of (R, G, B) that is an output value is specified in the same row. For example, the output value for the input value (0, 0, 17) described in the second row of the table 3 is (R1, G1, B1) specified in the second row of the table 4. Note that, in the case where a signal value between the lattice points specified in the table 3 is inputted, an output can be calculated by using publicly-known interpolation.

The conversion table generating unit 808 generates the aforementioned 3D-LUT for converting the input value RGB1 to the output value RGB2. This generation is described below. The image processing apparatus according to the present embodiment includes in advance the table 3 and a table in which output values are specified as in the form of the table 4 corresponding to the table 3, depending on the fluorescence light emission amount FP 11. Specifically, these tables are tables in which the eventually-obtained relationships between the RGB1 and RGB2 described above in FIGS. 10A to 10C are obtained in advance depending on the value of the fluorescence light emission amount FP_l1, and are defined as the contents of the tables. Accordingly, executing color conversion by using these tables enables obtaining of RGB2 from which the color development component due to the fluorescent color material is separated as described in FIGS. 10A to 10C.

Specifically, eleven tables are prepared for the respective values of FP_l1-0, 10, . . . , 100. Then, the conversion table generating unit 808 generates a new conversion table from the prepared tables, according to the inputted value of FP_l1. For example, assume a case when, for FP_l1=X1, X2, a value X3 between X1 and X2 is inputted into the conversion table generating unit 808. In the case when the table prepared for the FP_l1=X is referred to as LUT_X, values of each of elements of LUT for FP_l1=X3 can be generated by using proportional distribution according to values of differences between X1 and X3 and differences between X2 and X3 for the values of the corresponding elements respectively in LUT_X1 and LUT_X2. Moreover, RGB1 is a signal value corresponding to the sum of the color development component of the subtractive color mixture color material and the color development component of the fluorescent color material in the case when the fluorescent color material is applied, and RGB2 is a signal value corresponding to the color development component of the subtractive color mixture color material in the case when no fluorescent color material is applied. Accordingly, the prepared LUT_X described above corresponds to a change in the signal value between the case when the fluorescent color material is applied at an amount at which FP_l1 takes a value X and the case when no fluorescent color material is applied, that is a difference between RGB1 and RGB2.

With reference to FIG. 9 again, the first print data generating unit 705 converts the signal value RGB2 corrected by the fluorescence color development amount correcting unit 703 to the print data. This step can be performed by using a publicly-known method of converting normal RGB signals to signals of CMYK that are ink colors.

The second print data generating unit 706 generates the print data based on the fluorescence light emission amount FP_l1 obtained by the fluorescence light emission amount obtaining unit 702. This print data is print data for the fluorescent pink ink in the present embodiment.

Figure 12A:
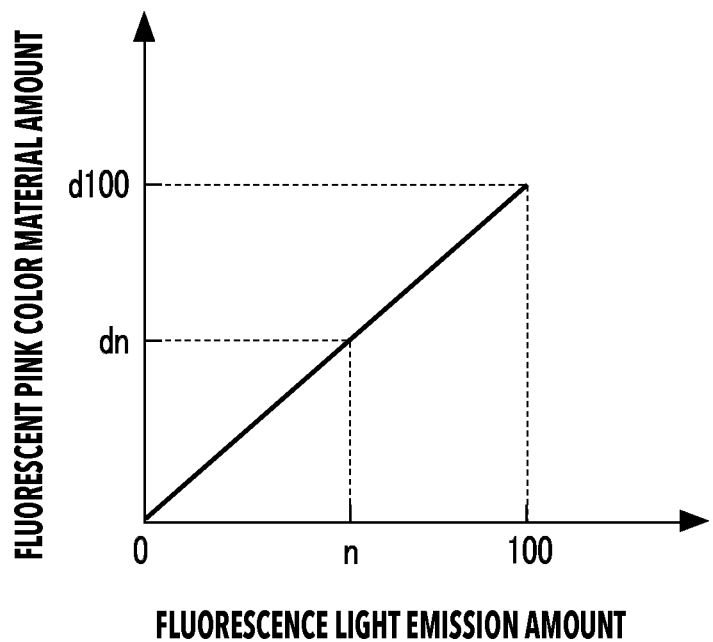
FIGS. 12A and 12B are diagrams explaining print data generation by a second print data generating unit.
Figure 12B:
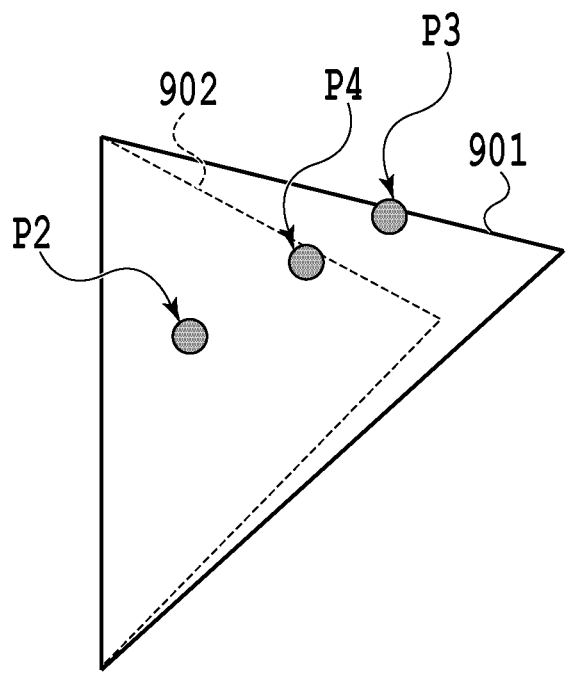

FIGS. 12A and 12B are diagrams explaining the print data generation by the second print data generating unit 706.

In FIG. 12A, the horizontal axis represents the fluorescence light emission amount, and the vertical axis represents the fluorescent pink color material amount. The second print data generating unit 706 generates the print data according to the relationships (table) illustrated in FIG. 12A. Specifically, conversion is performed based on such a proportional relationship that, in the case when the fluorescence light emission amount (FP_l1)=100, the fluorescent pink color material amount=d100, that is, in the case when the fluorescence light emission amount=n, the fluorescent pink color material amount=dn.

With reference to FIG. 9 again, the print data generated by the first print data generating unit 705 and the print data generated by the second print data generating unit 706 are synthesized. Then, the synthesized data is supplied to the printing unit 203 as print data expressing the types and amounts of inks capable of reproducing the color development component and the light emission component due to the fluorescent color material in the original image.

In the present embodiment, since the fluorescent pink ink is used, the second print data indicates an application amount of the fluorescent pink ink. However, the method of the present disclosure can be applied to a printing apparatus that uses no fluorescent pink ink. Specifically, performing printing with the subtractive color mixture ink according to the synthesized print data described above enables printing of a reproduced image in which the saturation is increased depending on the fluorescent pink color material.

FIG. 12B is a cross-sectional diagram of a hue near the pink color, and illustrates a device independent color space. In FIG. 12B, the vertical direction represents lightness L, and the horizontal direction represents saturation. Reference sign 901 denotes a color gamut reproducible by using the fluorescent pink ink, and reference sign 902 denotes a color gamut reproducible in the case when no fluorescent pink ink is used. Moreover, the point P2 is a mapping point of the pink color in the read image in the case when the method of the present disclosure is not applied. It is found from this that, in the case where the method of the present disclosure is not applied, the fluorescent pink in the original image is read as pink with lower saturation as described above. The image with low saturation thus has the low-saturation mapping point P2 also in the printer gamut as described above.

Meanwhile, applying the method of the present disclosure allows the color development component of the subtractive color mixture color material and the color development component of the fluorescent pink color material to be separated from each other, and the ink amount is determined for each of the color development components and applied. The light emission/color development component of the fluorescent pink color material is thereby reproduced with the fluorescent pink ink, and an image is resultantly printed in a color of the point P3 with higher saturation. Moreover, also in the case when no fluorescent pink ink is used, the magenta ink corresponding to the light emission/color development component of the fluorescent pink color material can be applied by being laid on a subtractive color mixture ink determined based on the color development component of the subtractive color mixture color material. Accordingly, an image is printed in a color of the point P4 with higher saturation than the point P2, as a printed result.

(Relationships Between Other Fluorescent Color Materials and Each of Exciting Wavelength, Light Emission Wavelength, and the Like)

The aforementioned problem of not being able to determine the light emission component in the reading in the case when the fluorescent pink color material is used may similarly occur also in the case where fluorescent color materials other than the fluorescent pink is used. A description is given below of examples of applying the method of the present disclosure to, for example, fluorescent green that emits light in the green region, fluorescent yellow that emits light in the yellow region, fluorescent red or fluorescent orange that emits light in the red region, as in the case of the fluorescent pink.

Figure 13A:
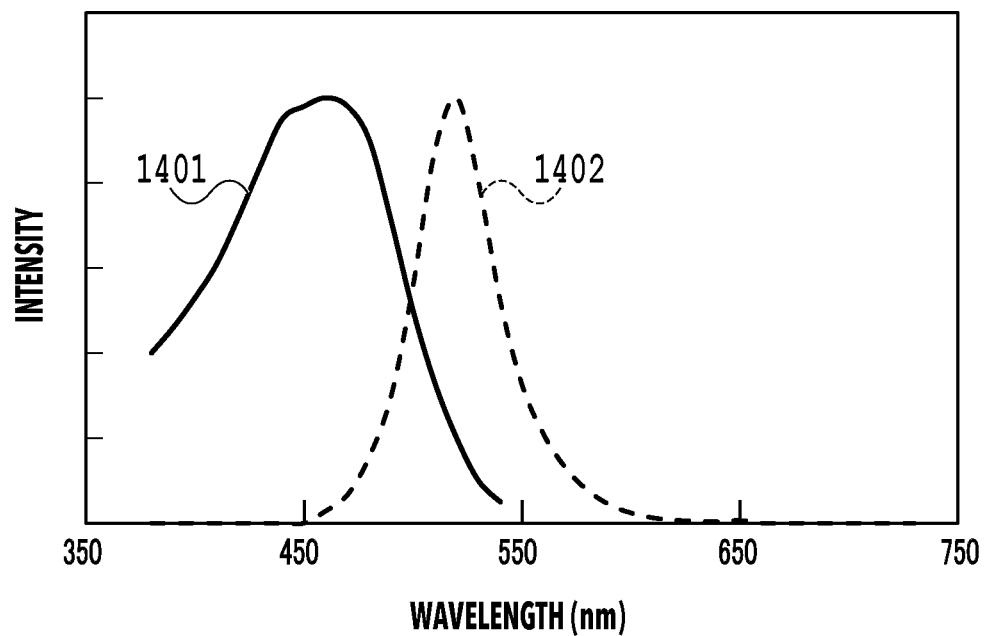
FIGS. 13A and 13B are diagrams explaining determination of a light emission amount component in the case when a fluorescent color material of fluorescent green is used.
Figure 13B:
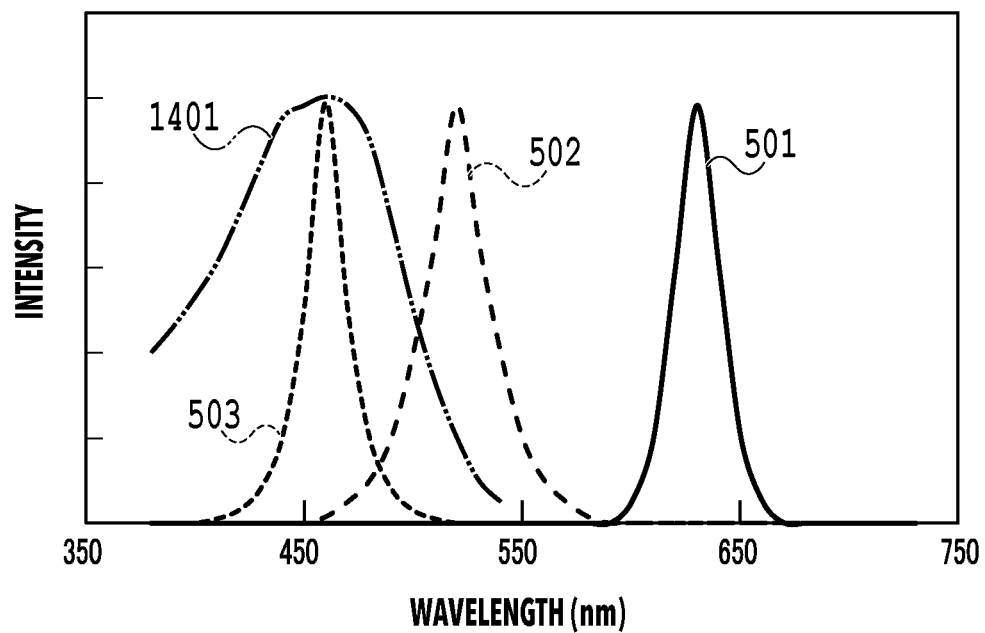

FIGS. 13A and 13B are diagrams explaining a configuration for determining the light emission component in the case where the fluorescent green is used as the fluorescent color material, and illustrate contents similar to the contents of FIG. 5 and FIG. 6B described above.

As illustrated in FIG. 13A, a wavelength range (wavelength range corresponding to excitation 1401) capable of exciting a fluorescent green ink partially overlaps and is on the shorter wavelength side of a wavelength range (wavelength range corresponding to light emission 1402) in which the fluorescent green ink emits light. Moreover, the light emission 1402 occurs in the wavelength range of the green region (in the example of FIG. 13A, the peak wavelength is about 520 nm). Furthermore, as illustrated in FIG. 13B, the wavelength range 503 of the B-LED that emits blue light overlaps the wavelength range that causes the excitation 1401. Meanwhile, the wavelength range 501 of the R-LED that emits red light and the wavelength range 502 of the G-LED that emits green light have substantially no overlap or have a small overlap with the wavelength range that causes the excitation 1401. Accordingly, in the case when the fluorescent green color material is used, the light amount detected by a G sensor for green in irradiation with the B-LED can be used as the fluorescence light emission amount. Moreover, the configuration of the sensors may be such that, in configurations as in FIGS. 3B and 3C, the sensor array 312 and the sensors 315 with filters may be formed of the G sensors that receive only light in a green wavelength range.

Figure 14A:
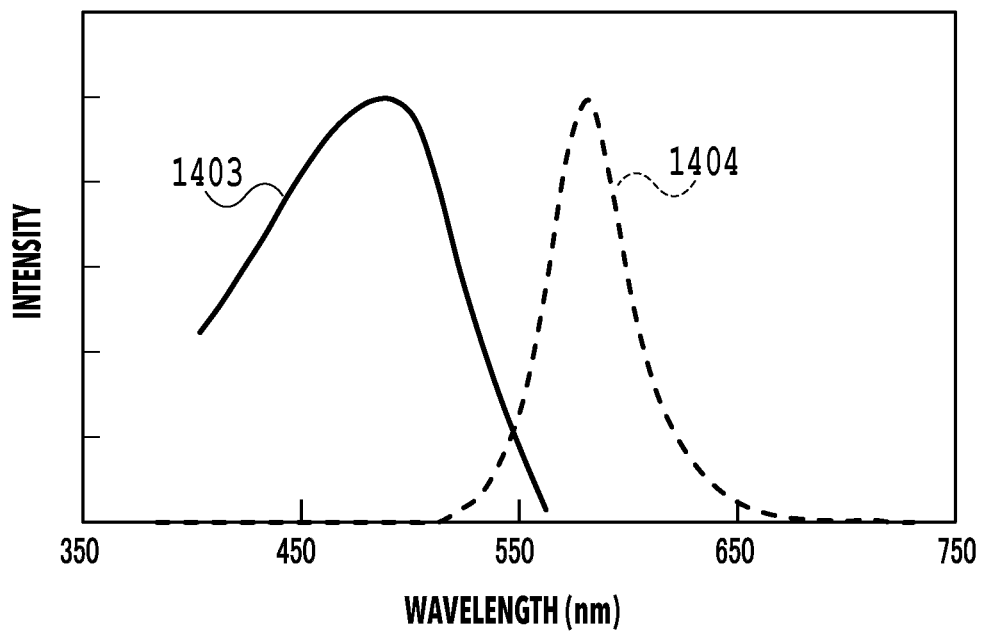
FIGS. 14A and 14B are diagrams explaining determination of a light emission amount component in the case when a fluorescent color material of fluorescent yellow is used.
Figure 14B:
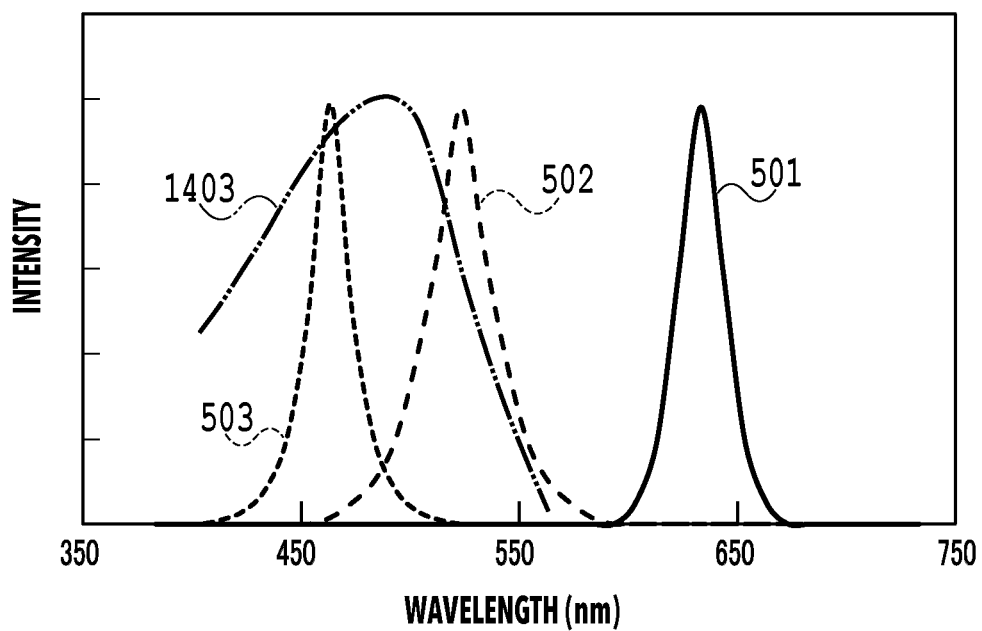

Similarly, FIGS. 14A and 14B are diagrams explaining a configuration for determining the light emission component in the case when the fluorescent yellow is used. As illustrated in FIG. 14A, the wavelength range (wavelength range corresponding to excitation 1403) capable of exciting a fluorescent yellow ink partially overlaps and is on the shorter wavelength side of a wavelength range (wavelength range corresponding to light emission 1404) in which the fluorescent yellow ink emits light. Moreover, the light emission 1404 occurs in a wavelength range of a green to red region (in the example of FIG. 14A, the peak wavelength is about 580 nm). Furthermore, as illustrated in FIG. 14B, the wavelength range 503 of the B-LED and the wavelength range 502 of the G-LED overlap the excitation 1403. Meanwhile, the wavelength range 501 of the R-LED does not overlap the wavelength range that causes the excitation 1403. Accordingly, in the case when the fluorescent yellow color material is used, the light amount detected by the G sensor or the R sensor in irradiation with the B-LED can be used as the fluorescence light emission amount. Alternatively, the fluorescence light emission amount can be detected by using the G-LED and the R sensor. In the case when the G sensor is used as the sensor for detection, in configurations as in FIGS. 3B and 3C, the sensor array 312 and the sensors 315 with filters can be formed of the G sensors that receive only light in the green wavelength range.

Figure 15A:
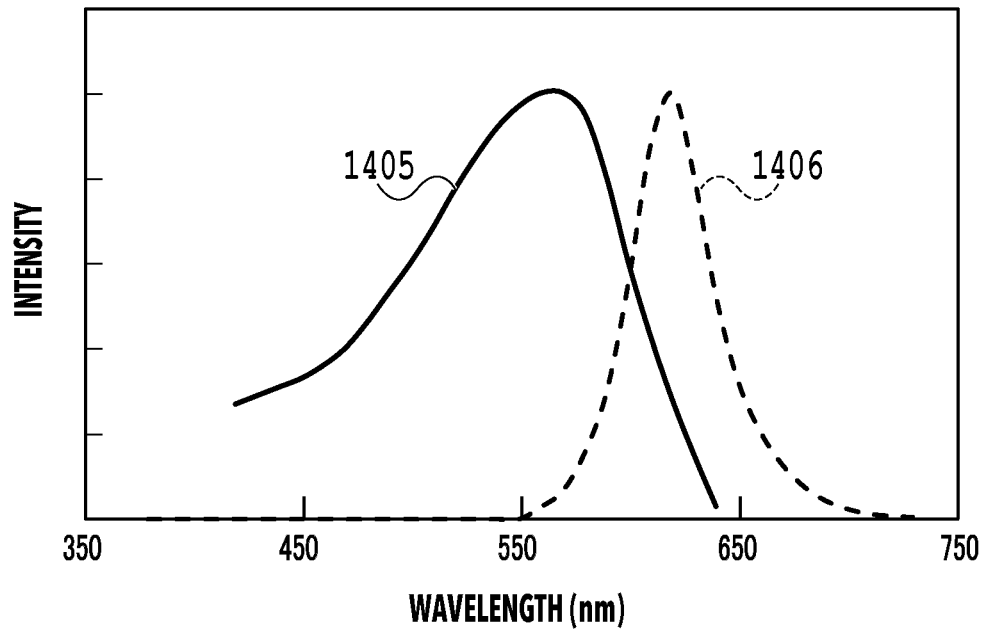
FIGS. 15A and 15B are diagrams explaining determination of a light emission amount component in the case when a fluorescent color material of fluorescent red or fluorescent orange is used.
Figure 15B:
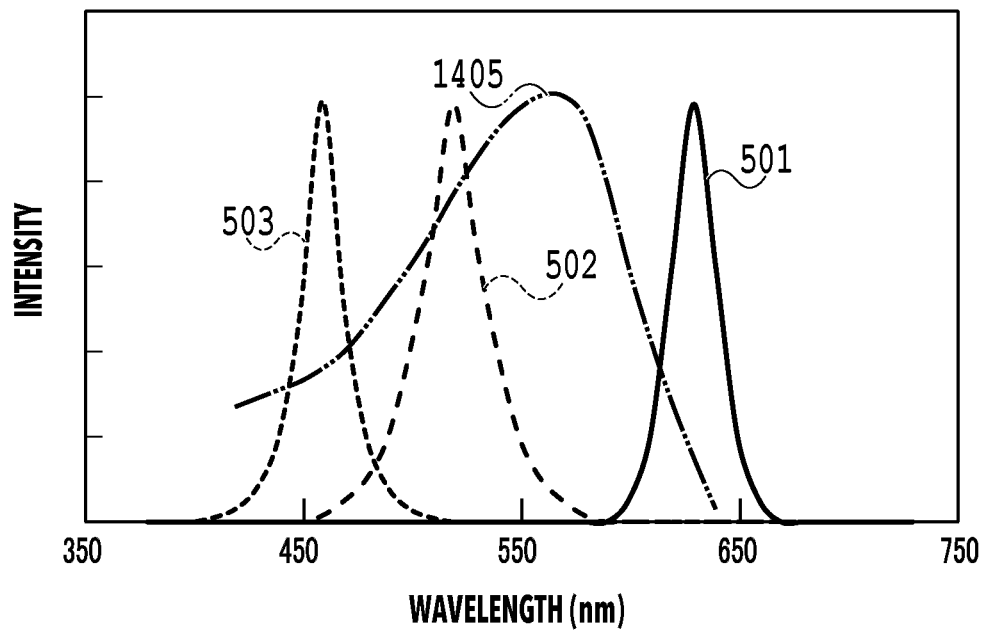

Moreover, similarly, FIGS. 15A and 15B are diagrams explaining a configuration for determining the light emission component in the case when the fluorescent red is used as the fluorescent color material. As illustrated in FIGS. 15A and 15B, excitation 1405 of a fluorescent red color material overlaps the wavelength range 502 of the G-LED for green, and emits light in a red wavelength range (in the example of FIG. 15A, the peak wavelength is about 620 nm). Accordingly, as in the fluorescent pink, the light amount detected by the R sensor in the irradiation of the G-LED can be used as the fluorescence light emission amount. The fluorescent orange has a wavelength characteristic close to that of the fluorescent red, and the fluorescence light emission amount can be similarly detected by using the G-LED and the R sensor.

As is apparent from the aforementioned description, the irradiation light that excites the fluorescent color material and the detection of the light emission based on this excitation have the following relationship. The irradiation light that excites the fluorescent color material is light in a wavelength range of visible light, and the light emission based on the excitation is detected at a wavelength excluding the wavelength of the irradiation light. Specifically, in the case when an image using a certain fluorescent color material is to be read, the light emission amount can be obtained by using an irradiator configured to output the irradiation light and satisfying the aforementioned conditions and a detector configured to detect the light emission and satisfying the aforementioned conditions.

(Generation of Print Data for Other Fluorescent Color Materials)

In the case when the fluorescent color material of the fluorescent green, the fluorescent yellow, the fluorescent red, or the fluorescent orange described above is used, the print data can be generated as follows. This generation is similar to that in the case of using the fluorescent pink color material illustrated in FIGS. 12A and 12B.

In a form in which the printing apparatus is provided with the fluorescent green ink, in the case when a fluorescent green region of the original image is to be printed, correspondence relationships between the fluorescence light emission amount and the fluorescent color material amount as described in FIG. 12A are prepared. Then, there is generated print data that causes the fluorescent green color material to be applied depending on the detected fluorescence light emission amount. Meanwhile, in a form in which the printing apparatus is provided with no fluorescent green ink, there is generated print data that causes the subtractive color mixture cyan ink and the subtractive color mixture yellow ink corresponding to the light emission/color development component of the fluorescent green color material to be applied while being laid one on top of the other. As a result, printing can be performed in a color with higher saturation as in the case described above in FIG. 12B.

The same applies to the other colors. In a form in which the printing apparatus is provided with the fluorescent yellow ink, the fluorescent yellow ink is applied depending on the fluorescence light emission amount and, in a form in which the printing apparatus is provided with no fluorescent yellow ink, a large amount of the non-fluorescent subtractive color mixture yellow ink is used. The same applies to the fluorescent orange and the fluorescent red. In a form in which the printing apparatus is provided with a fluorescent orange ink or a fluorescent red ink, the fluorescent ink is applied depending on the fluorescence light emission amount. In a form in which the printing apparatus is provided with no fluorescent ink, a large amount of the subtractive color mixture yellow ink and the subtractive color mixture magenta ink are used. In any case, it is possible to apply a larger amount of a subtractive color mixture ink and to reproduce an image with a higher saturation than in the case when the method of the present disclosure is not applied. Particularly, a read value of fluorescent yellow, orange, or the like, is relatively bright and is close to paper white, and such colors tend to disappear in a reproduced image. Accordingly, it is effective to apply a subtractive color mixture ink such that a color development component is guaranteed without fluorescence light emission.

(Other Forms)

Although a flatbed scanner is used as a reading apparatus in the aforementioned embodiment, the reading apparatus is not limited to this form. For example, in the case when the fluorescent color material of fluorescent pink is used, it is only necessary to perform irradiation with green light and to receive light in the red region. For example, the optical sensor 214 provided in the carriage 213 may have this function. In this case, the reading for obtaining the RGB image and the reading for obtaining the fluorescence light emission amount are separate operations. For example, the original image is first read by a flatbed scanner, and the read RGB image is obtained by the irradiation of RGB-LEDs and the light reception of W sensors. Next, the same original is fed by an automatic sheet feeder of the printing apparatus, and read by the optical sensor 214 in a reciprocating operation of the carriage 213, and the fluorescence light emission amount can be thereby obtained.

Moreover, various parameters in the LUTs for color conversion, and the like, may be provided for each of print modes in printing. This is because, in an inkjet printer, the light emission/color development varies depending how the fluorescent ink and the subtractive color mixture ink form an image in output. Such a phenomenon that the color development varies depending on the laying order of inks is known in conventional subtractive color mixture inks. In the fluorescent ink, the light emission amount also varies depending on the laying order of inks. Accordingly, it is effective to vary the parameters for color conversion between two modes in which different print controls varying in the laying order of inks are performed.

Second Embodiment

In the first embodiment, a description is given of the example in which the color development amount of the fluorescent color material is estimated based on the obtained fluorescence light emission amount, the color development component of the subtractive color mixture color material and the color development component of the fluorescent color material included in the read image in a mixed manner are separated from each other, and the pieces of print data are generated for the respective color development components. A second embodiment of the present disclosure relates to a form of separating and correcting the light emission component due to the fluorescent color material that may be included in each of the channels of R, G, and B in a mixed manner.

As described above, in the reading of the original image formed by using the fluorescent color material, the light emission occurs in the wavelength range different from the wavelength of the irradiation light. FIGS. 5, 6A, and 6C are referred to again. As can be found from FIGS. 5 and 6A, the fluorescent pink color material is hardly excited by the irradiation light (wavelength range) of the R-LED, but are excited by the irradiation of the G-LED and the B-LED. Moreover, the light emission by the excitation is substantially in the red region. Accordingly, in the case of the fluorescent pink color material, the light emission amount in the case when the R-LED is driven and the color material is irradiated with the red light is substantially zero, and is not reflected in the R-ch. Meanwhile, in the case when the G-LED irradiates the fluorescent pink color material with the green light, the light emission occurs near the red wavelength, and is received by the white sensor, and this light emission amount may be included in the G-ch. In FIG. 6C, the light emission 511 corresponds to this light emission. Green is a complementary color of red, and the greater the signal value of green is, the lower the saturation as the pink color is. The same applies to blue, and the light emission amount due to the excitation by the B-LED is included in the B-ch, and reduces the saturation. In the present embodiment, not only the color development component due to the fluorescent color material but also the light emission component is separated from the RGB image obtained by the reading.

Figure 16:
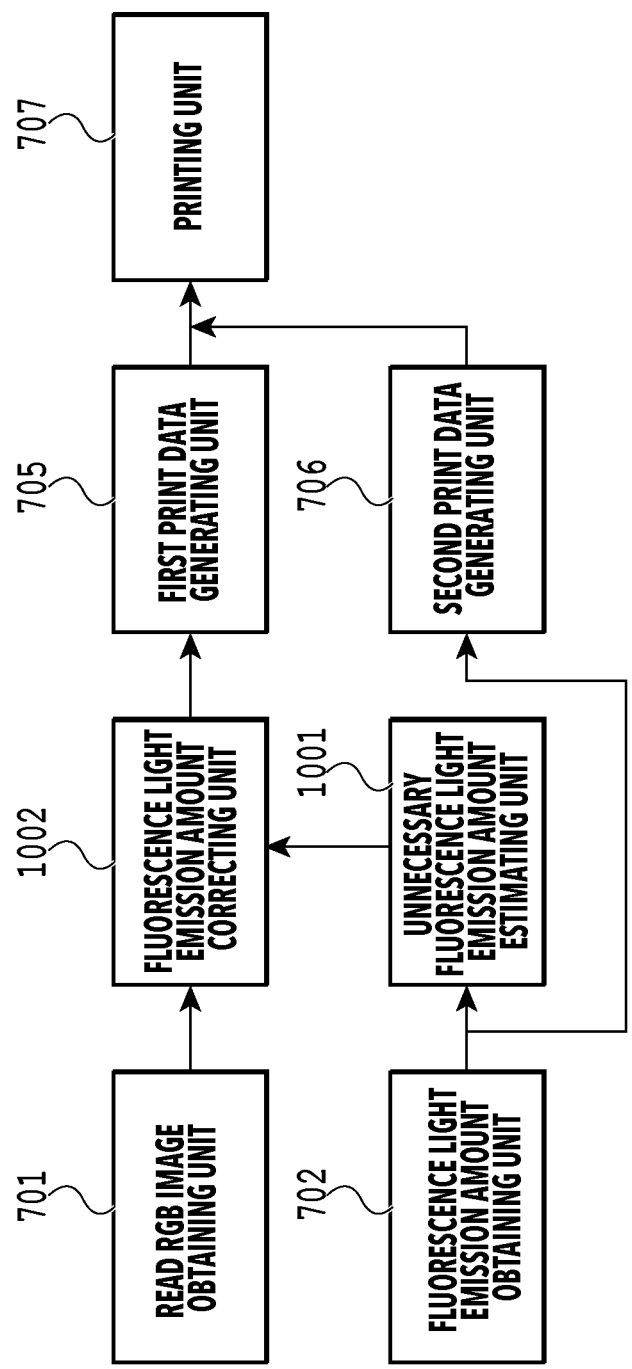
FIG. 16 is a diagram illustrating functional blocks in separation processing in the read image and print data generation based on the separation processing according to a second embodiment of the present disclosure.

FIG. 16 is a diagram illustrating functional blocks in separation processing in the read image and print data generation based on the separation processing according to a second embodiment of the present disclosure, and is a diagram similar to FIG. 9. Blocks with the same functions are denoted by the same reference signs as those in FIG. 9.

As in the first embodiment, the read RGB image is obtained (701) and the fluorescence light emission amount is obtained (702) in the reading operation. An unnecessary fluorescence light emission amount estimating unit 1001 estimates a fluorescence light emission component that is excited by the irradiation of the G-LED and the B-LED and that may be included in complementary color channels such as the G-ch and the B-ch. Specifically, the unnecessary fluorescence light emission amount estimating unit 1001 estimates the fluorescence light emission amount from the fluorescence light emission amount obtained by irradiation of the G-LED and detection of the R sensor, the light emission intensities of the R, G, and B light sources at each wavelength, and the light-receiving sensitivity of the W sensor at each wavelength. In other words, the unnecessary fluorescence light emission amount estimating unit 1001 estimates the fluorescence light emission amount that is excited by irradiation of the G-LED and detected by the W sensor to be added to the G-ch. The fluorescence light emission amount added to the B-ch is also similarly estimated.

Details of the fluorescence light emission amount estimation are as follows. In the present embodiment, the distribution of light emission intensities of the light sources in the reading apparatus at the respective wavelength and the distribution of light-receiving sensitivities of the sensor in the reading apparatus at the respective wavelengths are known, and are illustrated in FIG. 6A. In the case when the fluorescent color material used in the original image is the fluorescent pink, the excitation intensity and the light emission intensity at each wavelength are as illustrated in FIG. 5. As can be found from FIG. 5, the excitation 401 has one wavelength a and another wavelength b whose excitation intensities are at such a ratio that the excitation intensity of one wavelength is double the excitation intensity of the other. This means that, in the case when the light of the wavelength a and the light of the wavelength b are made incident at the same light amount, the difference in the excitation amount is such that the excitation amount for one wavelength is double the excitation amount of the other. In that respect, the total amount of excitation is the sum of amounts of excitation caused by the respective wavelengths of the inputted light. Specifically, the excitation amount of the fluorescent pink in the irradiation of the LED is the sum of values each obtained by multiplying the light emission intensity of the LED at each of the wavelengths and the excitation intensity of the fluorescent pink color material at this wavelength. Moreover, the light emission amount is correlated to the excitation amount. Furthermore, the excitation amount and the light emission amount are in correlated relationships with the amount of the fluorescent color material. The detected light emission amount is a value obtained by multiplying the light emission amount and the light-receiving sensitivity of the sensor, and is correlated to the sum of amounts of light received at the respective wavelengths.

Figure 17:
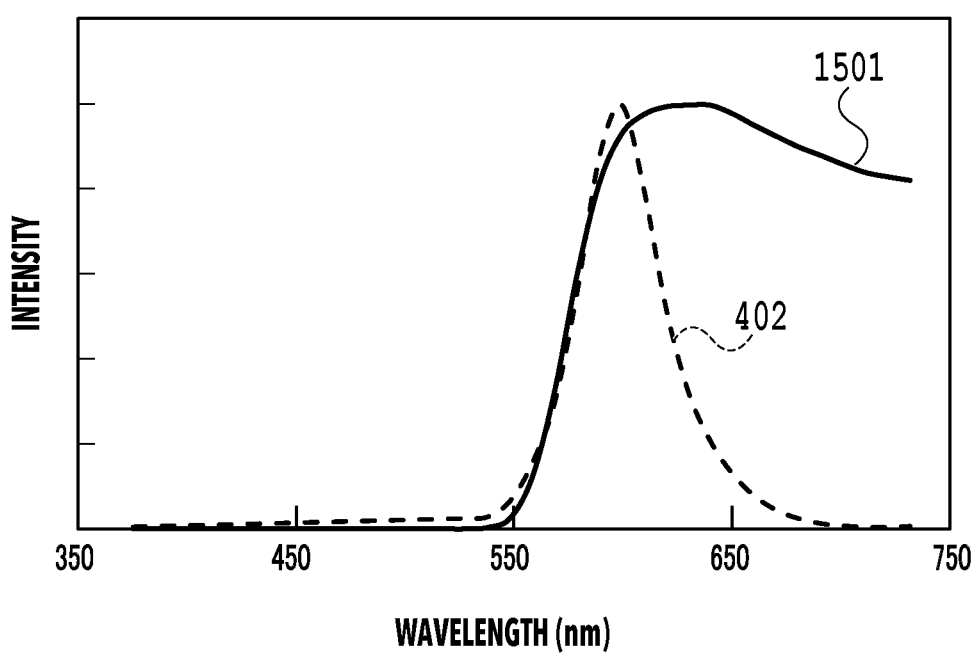
FIG. 17 is a diagram illustrating a light emission intensity of the fluorescent pink color material at each wavelength and a light-receiving sensitivity of the R sensor according to the embodiment of the present disclosure.

The fluorescence light emission amount obtaining unit 702 can obtain the light emission amount by receiving the fluorescence light emission with the R sensor in the irradiation of the G-LED as described above. FIG. 17 is a diagram illustrating the light emission intensity 402 of the fluorescent pink color material at each wavelength (same as that illustrated in FIG. 5) and a light-receiving sensitivity 1501 of the R sensor used in the fluorescence light emission amount obtaining unit 702. The horizontal axis represents the wavelength of light, and the vertical axis represents the intensity of the light emission and the light-receiving sensitivity. As can be found from FIG. 17, since the light emission component 402 of the fluorescent pink substantially overlaps the light-receiving region 1501 of the R sensor, the R sensor can receive the red light emitted by the excitation caused by the irradiation of the G-LED. Obtaining the light emission amount as described above enables estimation of an excitation amount required to obtain this light emission amount as described above. Moreover, the fluorescent color material amount in the original image can be estimated from the estimated excitation amount and the light emission amount. The unnecessary fluorescence light emission amount estimating unit 1001 can estimate the fluorescence light emission amount intensity in the original from the estimated fluorescent color material amount, the light emission intensity of the irradiating G-LED at each wavelength, and the excitation intensity of the fluorescent color material at each wavelength. Moreover, the light emission component to be actually received in the reading apparatus can be estimated from the distribution of light emission intensities at the respective wavelengths and the light-receiving sensitivities of the W sensor at the respective wavelengths. The light emission component estimated as described above is an unnecessary fluorescence light emission amount component in the G-ch. The unnecessary fluorescence light emission amount component can be similarly obtained also for the B-ch.

With reference to FIG. 16 again, a fluorescence light emission amount correcting unit 1002 corrects the read RGB image according to the estimated unnecessary fluorescence light emission amounts. This correction is a correction of removing the light emission component of the fluorescent color material and separating only the color development due to the subtractive color mixture color material and, in the case of the fluorescent pink, is correction in such a direction that the signal values of the G-ch and the B-ch are resultantly reduced to improve the saturation. As in the first embodiment, the first print data and the second print data are generated from the corrected RGB image and the fluorescence light emission amount, and the printing is performed.

In the present embodiment, the aforementioned image processing can separate the light emission component due to the fluorescent color material that is included in a mixed manner in the signals values of green and blue being the complementary color channels of the fluorescent pink. Moreover, an appropriate amount of ink can be applied for each of the color development component of the subtractive color mixture color material and the light emission/color development component of the fluorescent color material. As a result, it is possible to reproduce a color close to bright color development in the original region using the fluorescent color material.

Third Embodiment

In the first embodiment, the color development component of the fluorescent color material is subtracted from the read image and, in the second embodiment, the light emission component of the fluorescent color material that may be included in the complementary color channel in a mixed manner is subtracted. The color development component due to the subtractive color mixture color material alone can be thereby obtained from the read image. A third embodiment of the present disclosure relates to a form in which a white (W) LED is used as the light source used for the reading.

In the present embodiment, the reading unit 202 described in FIG. 3A includes the white LED and the G-LED as the light sources 304, and includes sensors provided with RGB filters as the sensor 306.

Figure 18:
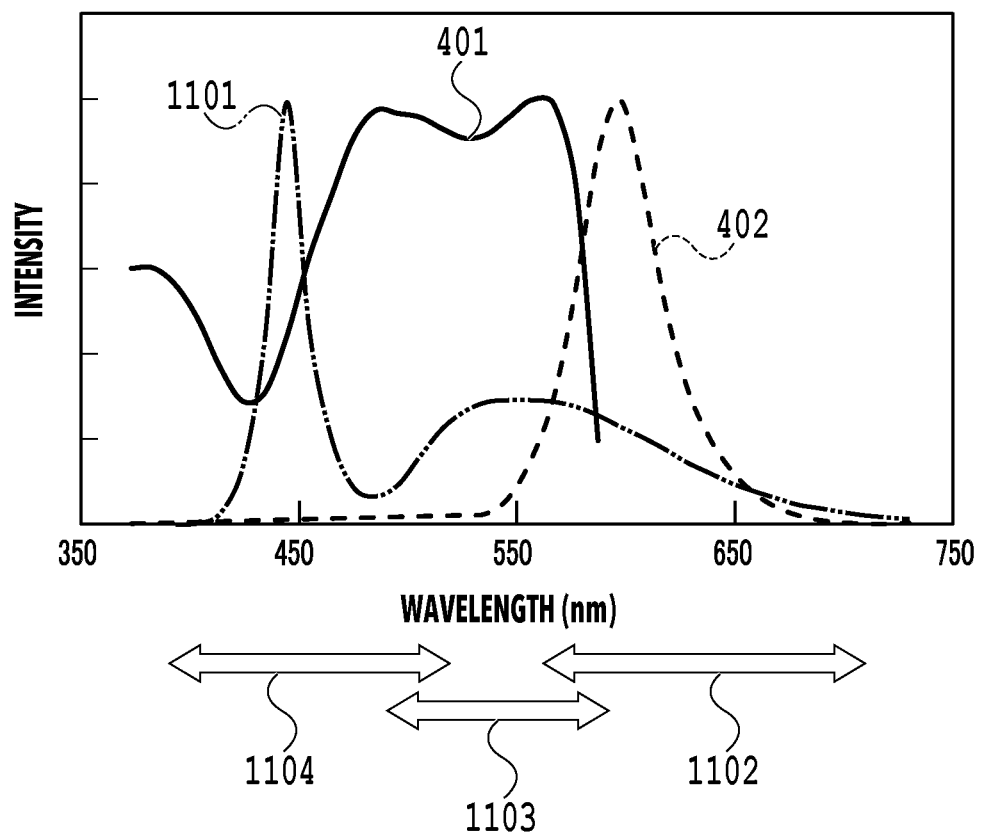
FIG. 18 is a diagram illustrating a light emission characteristic of a standard white LED and excitation and light emission of the fluorescent pink color material according to a third embodiment of the present disclosure.

FIG. 18 is a diagram illustrating a light emission characteristic 1101 of a standard white LED and the excitation 401 and the light emission 402 of the fluorescent pink color material according to the third embodiment of the present disclosure. The excitation and the light emission of the fluorescent pink color material are the same as those described above in FIG. 5, and are denoted by the same reference signs.

In a reading apparatus using the white LED, RGB filters installed on sensors are generally used to separate the read result into signals of three channels of R, G, and B. A value of light received by the sensor with the R filter of red is the signal value of the R-ch. Similarly, a value of light received by the sensor with the G filter of green is the signal value of the G-ch, and a value of light received by the sensor with the B filter of blue is the signal value of the B-ch. In the following description, the sensor with the R filter is referred to as "R sensor". The same applies to the G filter and the B filter. Generally, the color filters installed in the sensors have relatively broad color absorbing characteristics.

In FIG. 18, a wavelength range 1102 illustrates a light-receiving wavelength range of the R sensor, a wavelength range 1103 illustrates a light-receiving wavelength range of the G sensor, and a wavelength range 1104 illustrates a light-receiving wavelength range of the B sensor. Ideally, preferable characteristics of the filters are such that the filters respectively filter wavelength ranges not overlapping one another. However, in actual, there are overlapping portions as illustrated in FIG. 18. This means that, for example, reflected light near 520 nm is received by both of the G sensor and the B sensor, and the read results are included in both of the signal values of G-ch and B-ch.

Now, attention is paid to the excitation and the light emission of the fluorescent pink color material and the wavelength characteristics of the light sources and the filters. First, as can be found from FIG. 18, the white LED emits light over the entire wavelength range (1101) of visible light, and this wavelength range overlaps the exciting wavelength of the fluorescent pink. Accordingly, the white LED can excite the fluorescent pink and cause the fluorescent pink to emit light. However, the light emission of the white LED has a large peak in the blue region, and the light emission amount in the green region is small. Accordingly, the white LED cannot effectively excite the fluorescent pink, and the light emission amount due to the excitation of the fluorescent pink is smaller than that in, for example, a D50 light source. Moreover, regarding the light-receiving wavelength ranges of the sensors, since the R sensor light-receiving wavelength range 1102 overlaps the light emission wavelength range of the fluorescent pink, the R sensor can receive the light emission component of the fluorescent pink, and the fluorescence light emission amount is added to the R-ch in addition to the read RGB signal. Moreover, since the G sensor light-receiving wavelength range 1103 also overlaps the light emission wavelength range of the fluorescent pink, the G sensor also receives the light emission component of the fluorescent pink, and the fluorescence light emission amount may be added to the image signal of the G-ch that is the complementary color. Specifically, the signal values of the R-ch and the G-ch of the read image include the light emission component due to the fluorescent color material, in addition to the color development component of the subtractive color mixture color material and the color development component due to the fluorescent color material, in a mixed manner.

Also, in the present embodiment, the color development component due to the subtractive color mixture color material and the light emission/color development component due to the fluorescent color material that are included in the read image in a mixed manner are separated from each other, and are assigned to the appropriate pieces of print data, respectively, to improve a copy reproduced image.

Figure 19:
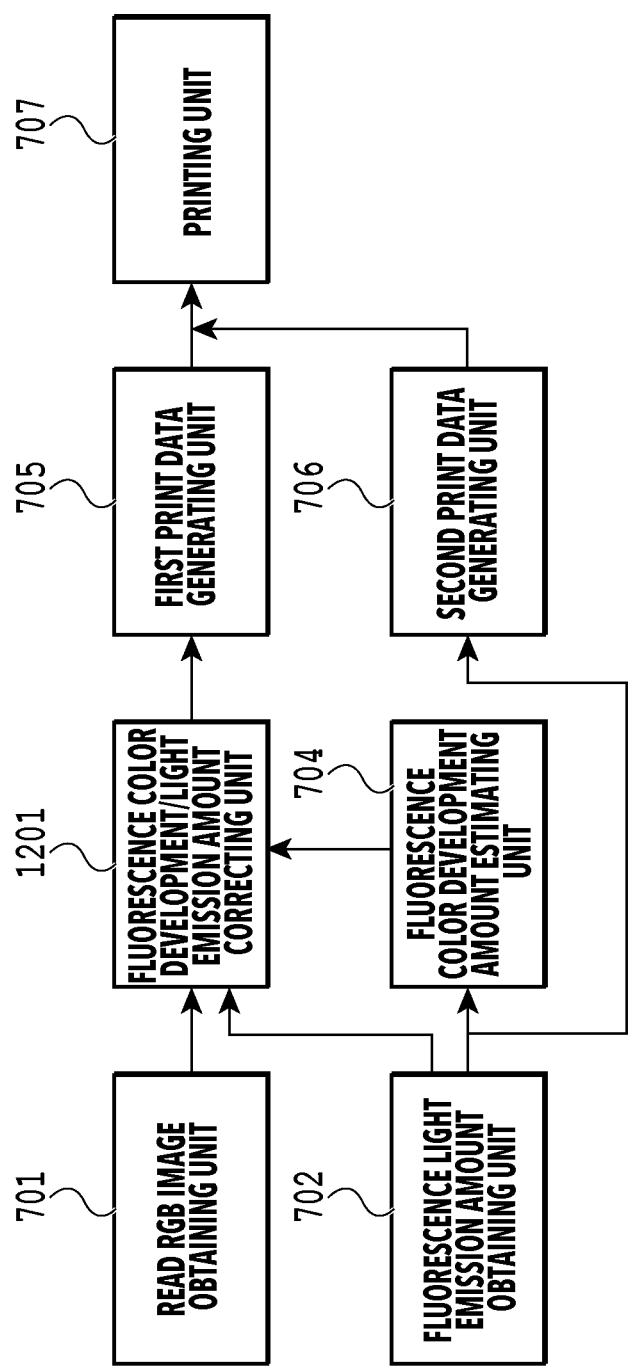
FIG. 19 is a diagram illustrating functional blocks in separation processing in the read image and print data generation based on the separation processing according to the third embodiment of the present disclosure.

FIG. 19 is a diagram illustrating functional blocks in separation processing in the read image and print data generation based on the separation processing according to the third embodiment of the present disclosure, and is a diagram similar to FIG. 9. Blocks with the same functions as those described in FIG. 9 are described while being denoted by the same reference signs.

As in the first embodiment, the read RGB image and the fluorescence light emission amount are obtained in the read operation. However, in the present embodiment, the read RGB image is obtained as an image obtained by driving the W-LED and receiving light with the RGB sensors, and a signal obtained by driving the G-LED and receiving light with the R sensor is used as the fluorescence light emission amount. Moreover, the fluorescence color development amount estimating unit 704 that estimates the fluorescence color development amount from the obtained fluorescence light emission amount is the same as that in the first embodiment.

In a fluorescence color development/light emission amount correcting unit 1201, the light emission component and the color development component due to the fluorescent color material are subtracted from the read RGB image to perform correction of separating only the color development component due to the subtractive color mixture color material. Regarding the fluorescence light emission component to be subtracted, light emission amounts in the respective R, G, and B channels can be estimated from the light emission amount obtained by the fluorescence light emission amount obtaining unit 702. As described above in the second embodiment, the fluorescent color material amount is estimated from the fluorescence light emission amount obtained by performing irradiation of the G-LED and receiving light with the R sensor. Moreover, the fluorescence light emission amount excited by the irradiation of the W-LED is estimated from the fluorescent color material amount and the light emission intensity of the W-LED at each wavelength in the present embodiment. Furthermore, the fluorescence light emission components added to the R-ch and the G-ch by receiving light with the R and G sensors are estimated from the fluorescence light emission amount, the distribution of light emission intensities 402 at the respective wavelengths, and the light-receiving sensitivities of the R sensor and the G sensor used in the present embodiment at each wavelength.

The fluorescence color development/light emission amount correcting unit 1201 subtracts the fluorescence component and the color development component estimated as described above in the fluorescence color development amount estimating unit 704. The light emission component and the color development component of the fluorescent color material can be thereby separated from the read RGB image, and the RGB signal can be made to include only the color development component due to the subtractive color mixture color material. As in the first embodiment, the first print data and the second print data are generated from the corrected RGB image and the fluorescence light emission amount, and the printing is performed.

Fourth Embodiment

In the first to third embodiments, an example of a copying apparatus that is the printer is described as the form of output. A fourth embodiment of the present disclosure relates to a form in which a monitor performs the output. In the reading, there is a case when a fluorescence light emission component is not reflected in a read image, and the saturation of the read image is low. For such a case, in the present embodiment, the read image is directly corrected based on the obtained light emission amount to increase the saturation of the read image.

As described above for the first to third embodiments, there is a case when a necessary light emission component is not included or oppositely an unnecessary light emission component is included in a mixed manner in each of the R, G, and B channels, depending on the combination of the types of light sources and sensors. These cases are corrected in the present embodiment.

Figure 20:
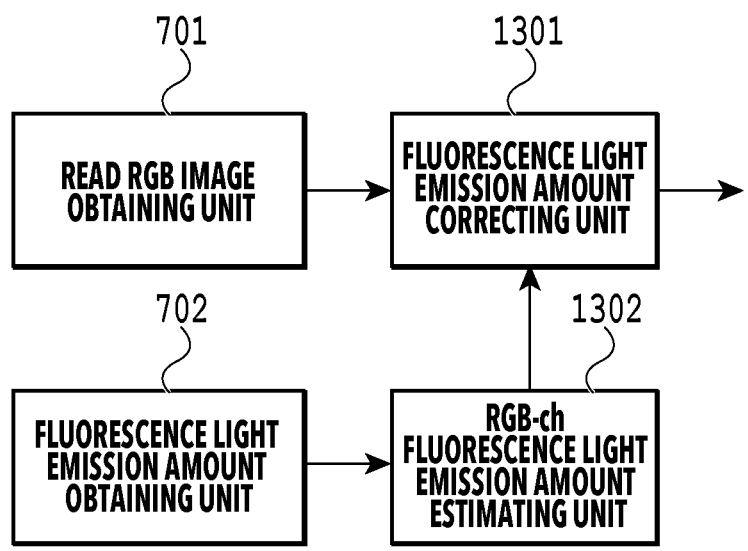
FIG. 20 is a block diagram illustrating image processing on the read image according to a fourth embodiment of the present disclosure.

FIG. 20 is a block diagram illustrating image processing on the read image according to the fourth embodiment of the present disclosure. In the present embodiment, as in the first to third embodiments described above, the read RGB image and the fluorescence light emission amount are obtained in the read operation. Assume a case when the R, G, and B-LEDs are used as the irradiator and the W sensor is used as the detector, as described in the first and second embodiments. In the case of the fluorescent pink color material, the R-ch may include a signal of the color development component due to the subtractive color mixture color material and a signal of the color development component due to the fluorescent color material. However, the R-ch includes no signal of the light emission component due to the fluorescent color material. Accordingly, in the present embodiment, the fluorescence light emission component is added to the R-ch. Meanwhile, in the G-ch and the B-ch, the light emission component due to the fluorescent color material may be received in addition to the color development component due to the subtractive color mixture color material and the color development component due to the fluorescent color material. Accordingly, the fluorescence light emission component is subtracted from the G-ch and the B-ch.

Moreover, in the form in which the W-LED is used as the irradiator as described in the third embodiment, the R-ch may include a signal of the color development component due to the subtractive color mixture color material, a signal of the color development component due to the fluorescent color material, and a signal of the light emission component due to the fluorescent color material. However, since the G-ch may include a signal of the light emission component due to the fluorescent color material in addition to a signal of the color development component due to the subtractive color mixture color material and a signal of the color development component due to the fluorescent color material, the fluorescence light emission component is subtracted.

An RGB-ch fluorescence light emission amount estimating unit 1302 estimates the fluorescence light emission amounts included in the respective R, G, and B channels by using the light emission wavelength characteristics of the LED and the light-receiving wavelength characteristics of the sensor, based on the fluorescence light emission amount obtained in the fluorescence light emission amount obtaining unit 702 by using the G-LED and the R sensor. Specifically, for the fluorescence light emission amount obtained in the fluorescence light emission amount obtaining unit 702, the RGB-ch fluorescence light emission amount estimating unit 1302 can separate and estimate the fluorescence light emission amount components included in the respective R, G, and B channels as in the description in the second embodiment. The estimated fluorescence light emission components in the respective R, G, and B channels are added and subtracted in a fluorescence light emission amount correcting unit 1301. Outputting the RGB signals subjected to this correction can make an output image to be an image closer to the original image.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

According to the present disclosure, it is possible to determine the light emission component by the excitation of the fluorescent color material and to reflect the light emission component in the reproduced image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   one or more processors that are configured:
      to obtain image data obtained by optically reading an original image;
      to obtain a fluorescence light emission amount obtained by optically detecting a fluorescent color material in the original image;
      to estimate, based on the obtained fluorescence light emission amount, a color component attributable to the fluorescent color material in the obtained image data, the color component attributable to the fluorescent color material including a color component of reflected light in the fluorescent color material and a color component caused by emission when the fluorescent color material transitions from an excited state to a ground state;
      to separate a color component attributable to a subtractive color mixture color material from the obtained image data by using the estimated color component attributable to the fluorescent color material; and
      to output image data obtained by the separation.

2. The image processing apparatus according to claim 1, wherein the one or more processors are further configured:
   to generate first print data based on the image data obtained by the separation; and
   to generate second print data based on the obtained fluorescence light emission amount,
   wherein the first print data and the second print data are synthesized, and the synthesized data is output to a printing unit.

3. The image processing apparatus according to claim 2, wherein the color component attributable to the subtractive color mixture color material is separated by subtracting the estimated color component attributable to the fluorescent color material from the obtained image data.

4. The image processing apparatus according to claim 2, wherein print data for one of a fluorescent color material, a set of a fluorescent color material and a subtractive color mixture color material, and a subtractive color mixture color material is generated as the second print data.

5. The image processing apparatus according to claim 2, wherein the second print data is generated by color conversion that is different for each of print modes varying in a laying order of color materials.

6. The image processing apparatus according to claim 1, wherein the fluorescence light emission amount is obtained based on light emission that is obtained by using an irradiator and a detector, and that is detected by the detector, the irradiator is configured to perform irradiation with irradiation light that is visible light and that is light with a wavelength range in which the fluorescent color material is excited, and the detector is configured to detect the light emission by the fluorescent color material at a wavelength excluding the wavelength of the irradiation light.

7. An image processing method comprising:
   based on a fluorescence light emission amount obtained by optically detecting a fluorescent color material in an original image, estimating a color component attributable to the fluorescent color material in image data obtained by optically reading the original image, the color component attributable to the fluorescent color material including a color component of reflected light in the fluorescent color material and a color component caused by emission when the fluorescent color material transitions from an excited state to a ground state;
   separating a color component attributable to a subtractive color mixture color material from the obtained image data by using the estimated color component attributable to the fluorescent color material; and
   outputting image data obtained by the separation.

8. A non-transitory computer-readable storage medium storing instructions that, when executed by a computer, cause the computer to perform an image processing method, the image processing method comprising:
   based on a fluorescence light emission amount obtained by optically detecting a fluorescent color material in an original image, estimating a color component attributable to the fluorescent color material in image data obtained by optically reading the original image, the color component attributable to the fluorescent color material including a color component of reflected light in the fluorescent color material and a color component caused by emission when the fluorescent color material transitions from an excited state to a ground state;

separating a color component attributable to a subtractive color mixture color material from the obtained image data by using the estimated color component attributable to the fluorescent color material; and
outputting image data obtained by the separation.

* * * * *